United States Patent [19]
Hall et al.

[11] Patent Number: 5,971,580
[45] Date of Patent: Oct. 26, 1999

[54] TACTICAL AWARENESS MONITORING AND DIRECT RESPONSE SYSTEM

[75] Inventors: Graham Thomas Hall; Robert Allyn Dick, both of Santa Barbara, Calif.

[73] Assignee: Raytheon Company, Lexington, Mass.

[21] Appl. No.: 08/633,651

[22] Filed: Apr. 17, 1996

[51] Int. Cl.$^6$ .................................................. G06F 19/00
[52] U.S. Cl. ........................ 364/188; 376/216; 376/259
[58] Field of Search ................................... 364/188, 189, 364/190, 191, 492, 494, 527, 550, 148–152; 376/216, 217, 248, 249, 259; 395/160, 161, 159, 155

[56] References Cited

U.S. PATENT DOCUMENTS

| | | | |
|---|---|---|---|
| 5,212,771 | 5/1993 | Gane et al. | 395/160 |
| 5,265,131 | 11/1993 | Scarola et al. | 376/259 |
| 5,271,045 | 12/1993 | Scarola et al. | 364/188 |
| 5,287,390 | 2/1994 | Scarola et al. | 364/188 |
| 5,557,549 | 9/1996 | Chang | 364/188 |
| 5,559,691 | 9/1996 | Monta et al. | 364/188 |

*Primary Examiner*—Reba I. Elmore
*Assistant Examiner*—Thomas E. Brown
*Attorney, Agent, or Firm*—Michaelson & Wall

[57] ABSTRACT

The present invention is an electronic awareness system for evaluating, monitoring, and controlling, in real-time, an outside environment having entities and occurrences with characteristics. The electronic monitoring system includes input sensors for receiving real-time data produced by the entities, a computer workstation for storing the input data in a database, a computer program having a graphical user interface for interfacing a user with the workstation and the computer program. The graphical user interface comprises a map frame chart function, a worksheet function, a utility function, and a priority navigator function for monitoring and evaluating the input data graphically, tabularly, statistically, and comparatively with a predetermined relative priority scale, respectively, for producing output data. The electronic awareness system also includes output reactors for receiving the output data for controlling certain entities and occurrences of the outside environment.

62 Claims, 17 Drawing Sheets

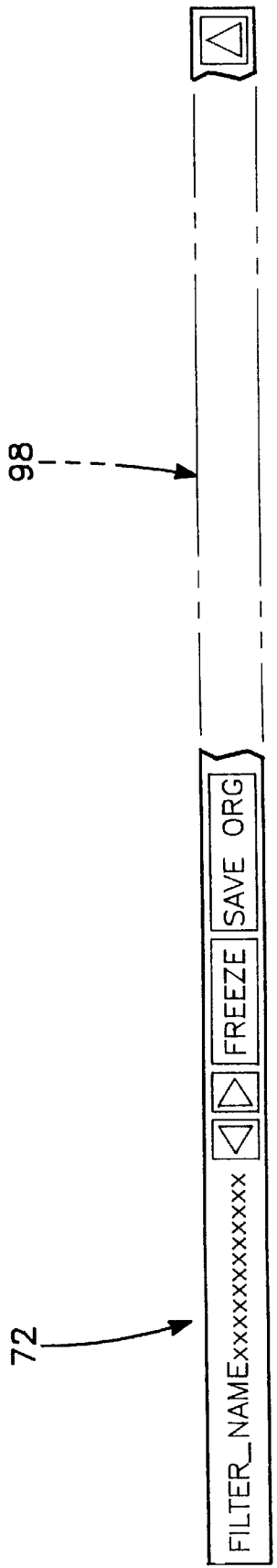
FIG. 12A
FIG. 12B

TACTICAL AWARENESS MONITORING AND DIRECT RESPONSE SYSTEM

BACKGROUND OF THE INVENTION

1. Field of the Invention

The present invention relates to electronic monitoring and response systems, and in particular to an electronic awareness monitoring system that evaluates and monitors real-time data from a situation for direct response and control of the situation.

2. Related Art

A major problem facing operators of systems which display real-time data and control situations defining the real-time data is the real-time integration of the data from numerous sources. Since the real-time data represents the current known environment, it is continuously changing. Operators must quickly and correctly integrate information of various types from multiple sources and make correct recommendations or take correct actions based on the real-time data. In some cases, the total available reaction time may be measured in seconds.

Many attempts have been made to solve this problem. For instance, several monitors have been placed in close proximity to the operator so that the operator could observe several different sources and react accordingly. However, this setup is uncomfortable and distracts the operator because of the inherent narrow views of fragmented data which hinders proper reaction. Also, this requires the human operator to integrate the information mentally by looking at several consoles or talking to people with the data.

In order to perform correct evaluations and make correct decisions, operators must be able to maintain a wide focus of their total environment while maintaining a narrow focus on their specific area of responsibility. This is especially true where the data represents real-time tactical situations. Consequently, in tactical environments, the costs of indecision of incorrect decisions are generally high, both in terms of lives and materiel.

Therefore, what is needed is an integrated system that receives and processes real-time data to provide an operator with a visual integration of the data for evaluation and use. What is also needed is a system that allows an operator to evaluate and monitor real-time data for rapidly recognizing significant situations for facilitating rapid response and control of the situations with maximum accuracy.

Whatever the merits of the above mentioned systems and methods, they do not achieve the benefits of the present invention.

SUMMARY OF THE INVENTION

To overcome the limitations in the prior art described above, and to overcome other limitations that will become apparent upon reading and understanding the present specification, the present invention is an electronic awareness system for evaluating, monitoring, and controlling, in real-time, an outside environment having entities and occurrences with characteristics.

The electronic monitoring system includes input sensors for receiving real-time data produced by the entities, a computer workstation for storing the input data in a database, a computer program having a graphical user interface for interfacing a user with the workstation and the computer program.

The graphical user interface comprises a map frame chart function, a worksheet function, a utility function, and a priority navigator function for monitoring and evaluating the input data graphically, tabularly, statistically, and comparatively with a predetermined relative priority scale, respectively, for producing output data. The electronic awareness system also includes output reactors for receiving the output data for controlling certain entities and occurrences of the outside environment.

A feature of the system of the present invention is an integrated function that receives and processes real-time data. Other features of the system present invention include real-time evaluation and controlling functions for rapidly recognizing and controlling significant incidents of the situation for facilitating rapid response and control of the situation with maximum accuracy.

A advantage of the present invention is that an operator remains completely aware of his tactical situation based on the real-time data. Another advantage is that the system of the present invention allows the operator to evaluate and use the real-time data while performing other special function tasks or special focus tasks.

The foregoing and still further features and advantages of the present invention as well as a more complete understanding thereof will be made apparent from a study of the following detailed description of the invention in connection with the accompanying drawings and appended claims.

BRIEF DESCRIPTION OF THE DRAWINGS

Referring now to the drawings in which like reference numbers represent corresponding parts throughout:

FIG. 12 is a detailed view of the worksheet toolbox of the all-track worksheet of FIG. 2;

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

Figure 1:
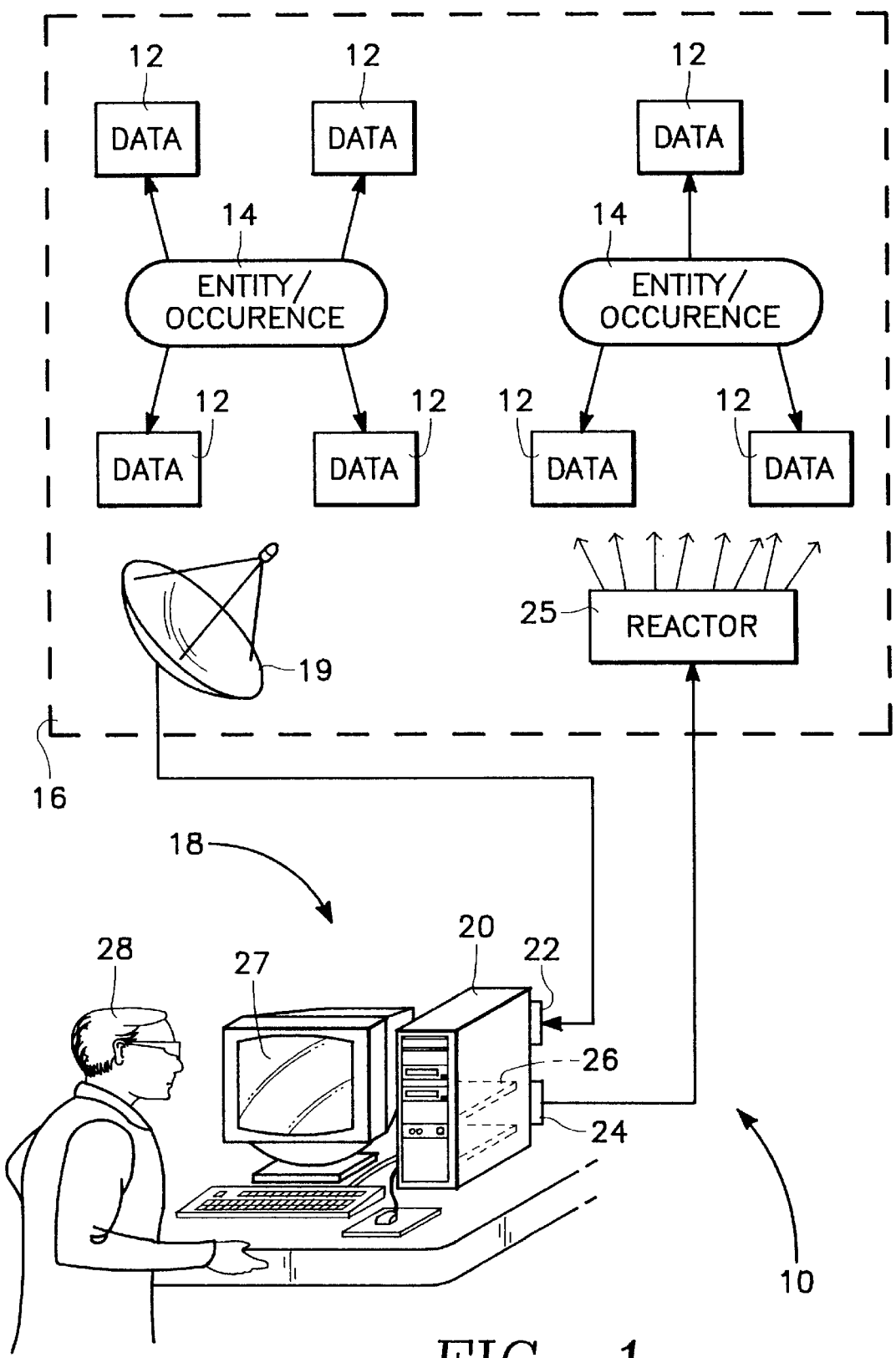
FIG. 1 is an overall block diagram of the present invention.

FIG. 1 is an overall block diagram of the present invention. The present invention is a tactical awareness monitoring and direct response system (TAMDRS) 10 for evaluating and monitoring data 12 produced in real-time by entities and/or occurrences 14 of an outside situation or environment 16 for direct response and control of the environment 16. The data 12 represents characteristics of the entities and/or occurrences 14.

The TAMDRS 10 comprises a workstation 18, such as a UNIX computer workstation, coupled to source sensors 19 located in the outside environment 16, for monitoring, evaluating and controlling the environment 16. The TAMDRS 10 further includes tactical awareness software 20 operating on the workstation 18. The workstation 18 receives the data 12, in real-time, as input 22 via the sensors 19 and transfers the data 12 to the tactical awareness software 20. The tactical awareness software 20 monitors, evaluates, and processes the data 12 to produce output data 24 in direct response to the data 12. The output data 24 is coupled to a reactor 25 located in the environment 16 for controlling certain entities and occurrences developing in the environment 16.

Figure 2:
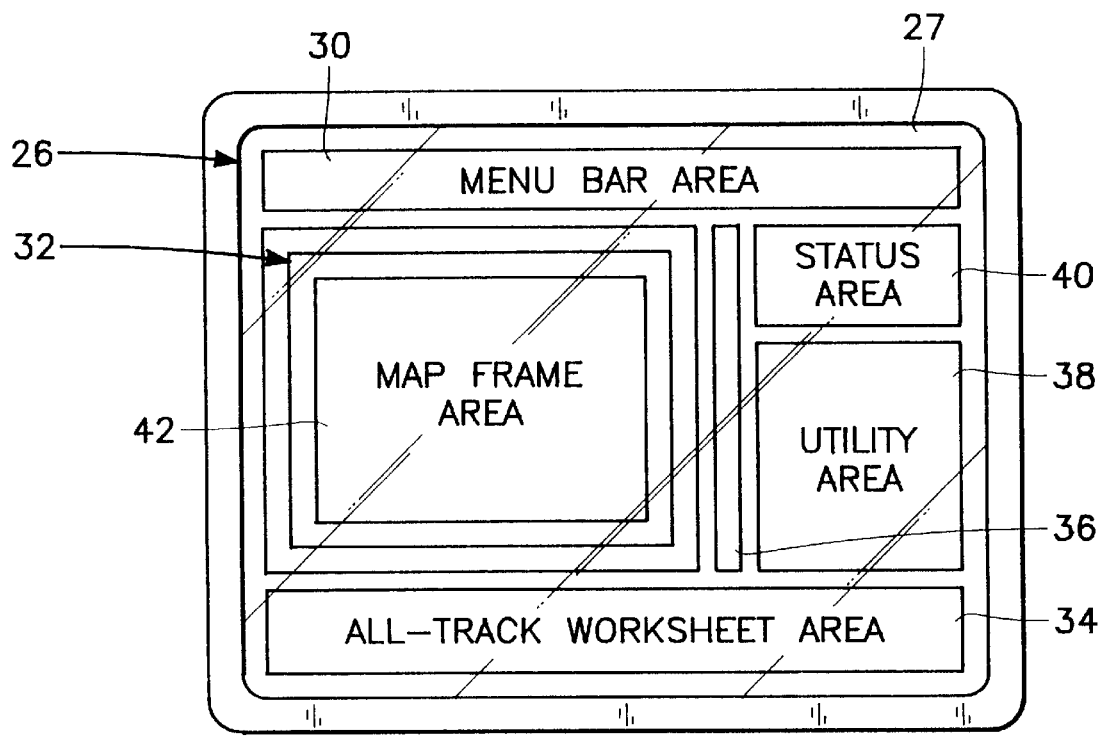
FIG. 2 is an overall illustration showing the graphical user interface of the present invention.

Referring to FIG. 1 along with FIG. 2, FIG. 2 is an overall illustration showing the graphical user interface of the present invention. The tactical awareness software 20 is an event driven program and includes a graphical user interface 26 on a primary display 27 for ease of use and interaction by an operator 28. Since the tactical awareness 20 software is event driven, the graphical user interface 26 constantly calls functions and sends messages to the tactical awareness software 20 to indicate that some event has occurred. This allows the tactical awareness software 20 to control and respond to data 12 and occurrences 14 developing in the outside environment 16. The events can include cursor movement, keystrokes, or mouse movements from the operator 28, as well as notifications and changes from the input 22 from the outside environment 16.

The graphical user interface 26 includes screen objects to provide event driven functionality for the tactical awareness software 20. The objects include a menu control bar 30 with pull down menu functions and four integrated windows or viewer areas that allow perception, manipulation, and control of the outside environment 16. The four window areas of the graphical user interface 26 include a map frame region 32, an all-track worksheet 34, a priority navigator 36, and a utility area 38. Also included is a status window area 40. The graphical user interface 26 allows the operator 28, such as a tactical operator, to perceive, view, and control the environment 16 in real-time, as well as prioritize tasks.

Specifically, the real-time data 12 received by the workstation 18 is stored in a real-time database. The real-time data 12 describes the entities and the occurrences 14 in the outside situation or environment 16. The entities 14 may represent the operator's 28 or others' aircraft, ships, airports, missile sites, national boundaries, air traffic control lanes, etc. in the outside environment 16. The real-time data 12 is evaluated and monitored and then processed by the software 20 for controlling the entities and occurrences 14 (thereby controlling the environment) in direct response to the real-time data 12.

The real-time database derives the real-time data 12 from the source sensors 19, such as radar, sonar, electronic surveillance, and infrared sensors, visual sightings, both collocated and remote (including data from orbiting sensors), as well as data from intelligence sources available. The characteristics of the entities and occurrences 14 are stored in the database. These characteristics can consist of, for example, the measured data elements (bearing, range, course, speed, altitude, etc.) and evaluated data elements (hostility, level of treat, intent, etc.). The reactor 25 can be the operator's 28 or another's aircraft, ship, airport, missile sites, national boundary, air traffic control lanes, etc. controlled by the operator 28.

The TAMDRS 10 of the present invention is applicable to any real-time situation or environment for monitoring, evaluating, and controlling the situation or environment. For example, the present invention can be used in console monitoring and response situations, such as in tactical awareness monitoring and response situations.

However, for illustrative purposes only, a naval tactical situation/environment with a surface naval database (referred to as a track file) is described in the present specification. For naval monitoring and response, tracks defining a tactical situation can be friendly, hostile, neutral, or the operator's ships, submarines, aircraft, land points, etc. Consequently, the entities comprising a tactical situation are referred to as tracks. A track has a bearing and range relative to a predetermined static or dynamic position (similar to map positioning).

Components

Map Frame Region

Figure 3:
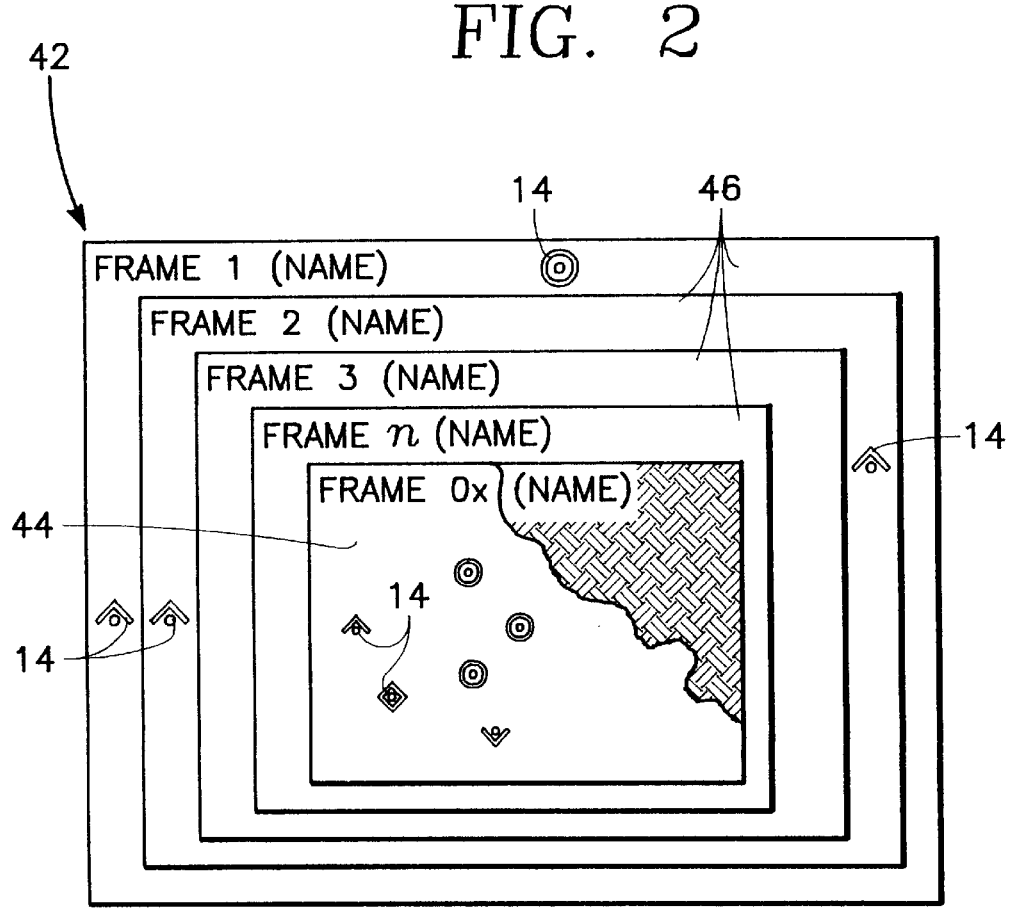
FIG. 3 is a detailed view of a geo-situational window of the map frame region of FIG. 2.

FIG. 3 is a detailed view of a geo-situational window of the map frame region of FIG. 2. The map frame region window area 32 includes a geo-situational window 42. The geo-situational window 42 is a graphical viewer for graphically evaluating and monitoring entities 14 in the tactical situation/environment 16, in the form of a database or a track file, and for controlling the tactical situation/environment 16. The geo-situational window 42 is located within the map frame region 32 of FIG. 2 and is composed of a plurality of nested frames, which can either be map/chart frames 44 or rangeless frames 46. The number and content of frames 44, 46 is operator selectable.

The lower limit number of frames 44, 46 is preferably one, such as Frame 0, and the upper limit is Frame n. The upper limit, Frame n, is determined by the operator selected size and attributes of the remaining frames, but is also dictated by the geometry and size of the viewing area 42. The attributes of a particular frame, which control the proportions of the particular frame as well as its contents, are stored by the software 20 and cataloged under a filter name (described below) or a name for the particular frame.

Database entities 14 may be selected by the operator 28 or by the software 20 automatically. Selection by the operator 28 involves any number of possible cursor or keyboard actions. The geo-situational window 42 may incorporate certain tools that allow the operator 28 to control certain attributes of the geo-situational window's 42 elements, such as the scale of the window area. The attributes of a particular frame view, which control the attributes of the particular frame as well as its contents, are stored by the software 20 and cataloged under a filter name, or a name of the particular frame.

The lower limit, Frame 0, is preferably the map/chart frame 44. The map/chart frame 44 displays symbols representing tracks or entities 14 for which the position of the track 14 is known, either measured or evaluated. The map/chart frame 44 is structured as a rectangular plan position indicator (PPI) with a map or chart backdrop. The map/chart frame 44 is scaled with actual distances of the tracks represented by the symbols, such as miles, kilometers, etc. The scaling is operator 28 selectable within the window area 42.

For example, symbols representing tracks 14 are automatically positioned on the map/chart frame 44 in scale relationship to their measured positions. Thus, the map/chart frame is 44 a dynamic representation of the positions and motions of each of the tracks 14. As a result, actual position changes of the track 14 within the environment 16, either relative or absolute, produce position changes in the map/chart frame 44.

The viewable content of the map/chart frame 44 is also selectable by the operator 28 with operator selectable filters based on the characteristics of the tracks 14. For example, the operator 28 may choose to view only tracks such as aircrafts with characteristics such as speeds exceeding a given speed, or surface craft tracks closer than a given distance. Thus, the lower limit is to view nothing, while the upper limit is to view all.

Figure 4:
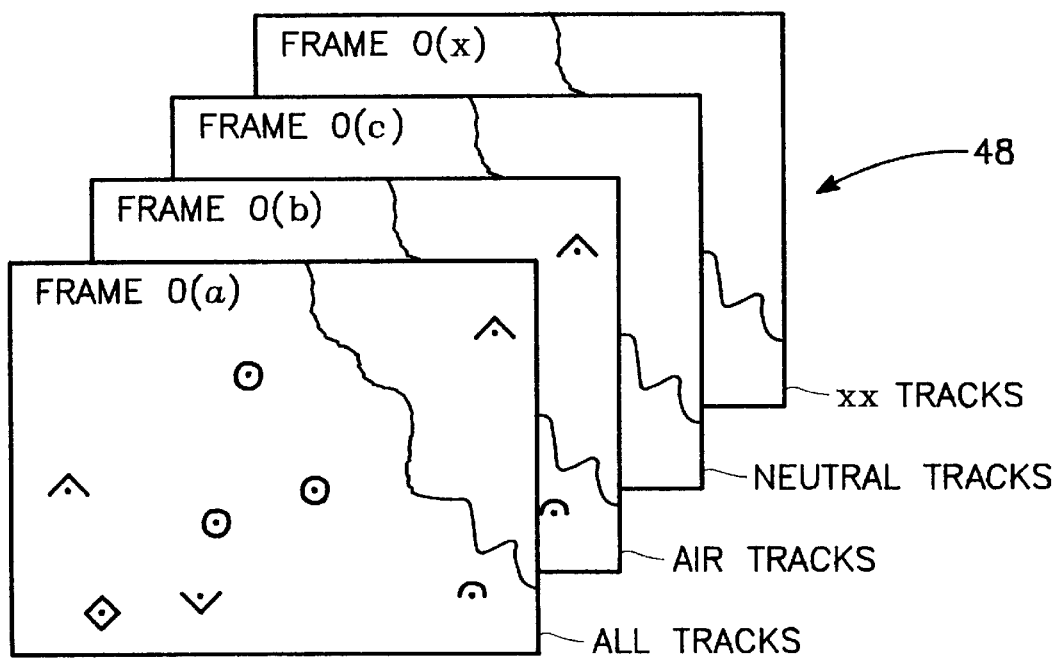
FIG. 4 is a detailed view of map/chart frame layers of the map frame region of FIG. 2, directly stacked one on top of the next layer.

FIG. 4 is a detailed view of stacked map/chart frames of the map frame region of FIG. 2. Because of the two-dimensionality of the map frame region, only one Frame 0 or map/chart frame 44, may be open or viewed at one time on within the geo-situational window area 42. However, filters for multiple map/chart frame instantiation views 48 can be created by the operator 28. The operator 28 can alternate between the multiple map/chart frame instantiation views 48. The multiple map/chart frame instantiations views 48 are shown in FIG. 4 as a series of Frame 0's (a, b, c, . . . , x) stacked one on top of the next instantiation view. One view, such as Frame 0(a), always contains all positioned tracks. The selection of a different filter view moves a corresponding frame to the front surface of the window area.

Figure 5:
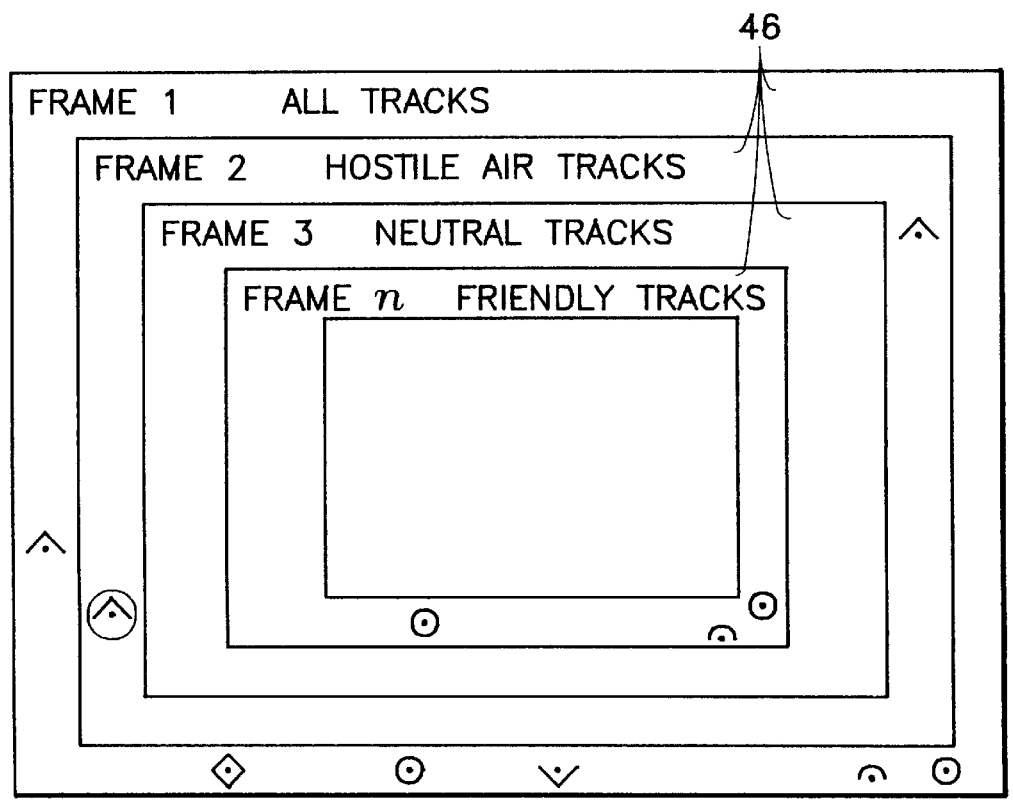
FIG. 5 is a detailed view of nested rangeless frames of the map frame region of FIG. 2.

FIG. 5 is a detailed view of nested rangeless frames of the map frame region of FIG. 2. Rangeless frames 46 are frames for displaying symbols representing particular tracks where only the direction or bearing of the particular tracks are known. Particular tracks with such characteristics are normally derived from passive sensors such as electronic surveillance, passive sonar, or visual sightings. Each symbol representing a particular track with such a characteristic is placed in one of the rangeless frames in the direction or bearing from the sensor that is reporting the particular track.

The position of a symbol, inward or outward in a given frame, is determined by other criteria, such as level of threat, weapons capability, etc. The operator 28 can chose to open any reasonable number of frames, adjust the size and proportions of each, and choose the filter criteria for the content of each frame, similar to the selections for the map/chart frame 44 as discussed above.

In addition, the operator 28 can close and open frames at will. Closing a particular frame would shrink the particular frame and its contents to zero thickness and redistribute the remaining frames into the available window area. Opening a particular frame is the reverse operation. Similar to the symbols for the tracks shown in the map/chart frame (Frame 0) of FIG. 4, the symbols for tracks in the rangeless frames, such as Frame 1 through Frame n, are dynamically positioned and adjusted as the real-time data 12 changes. For example, one frame, such as Frame 2, can contain certain rangeless tracks, such as hostile tracks, and another frame, such as Frame 1, can contains all rangeless tracks.

Filters

Referring back to FIG. 1 along with FIGS. 2–5, the concept of filtering certain tracks for viewing or action is pertinent to the functioning of the TAMDRS 10. An output of these filters, set by the operator 28 and the software 20, determines which tracks are displayed to the operator at any time in any window. Additionally, the filters control automated and semi-automated responses of the TAMDRS 10.

Creating or activating a filter creates an output or a filter view. The output of the filters, or the filter view, can be viewed by the operator 28 in the map frame region window 32, the worksheet window 34, and the priority navigator window 36 of FIG. 2, singularly or in combination. The purpose of viewing the tracks in the database after filtering certain tracks supports an operator's 28 need to focus on specific tasks. As shown in FIG. 5, the rangeless frames opened can be categorized into families or types of tracks based on the tactical situation. For instance, all tracks are located in Frame 1, all hostile tracks are located in Frame 2, all neutral tracks are located in Frame 3, and all friendly tracks are located in Frame n.

Symbols

The symbols shown in FIGS. 3–5 are for illustrative purposes only and are from the Navy Tactical Data System (NTDS) symbol set. The specific symbol set employed would be determined by the ultimate system function and environment 16. Any symbol set which graphically displays a minimum subset of the attributes of the database and which would be easily understood by the operator 28 could be used.

Figure 6:
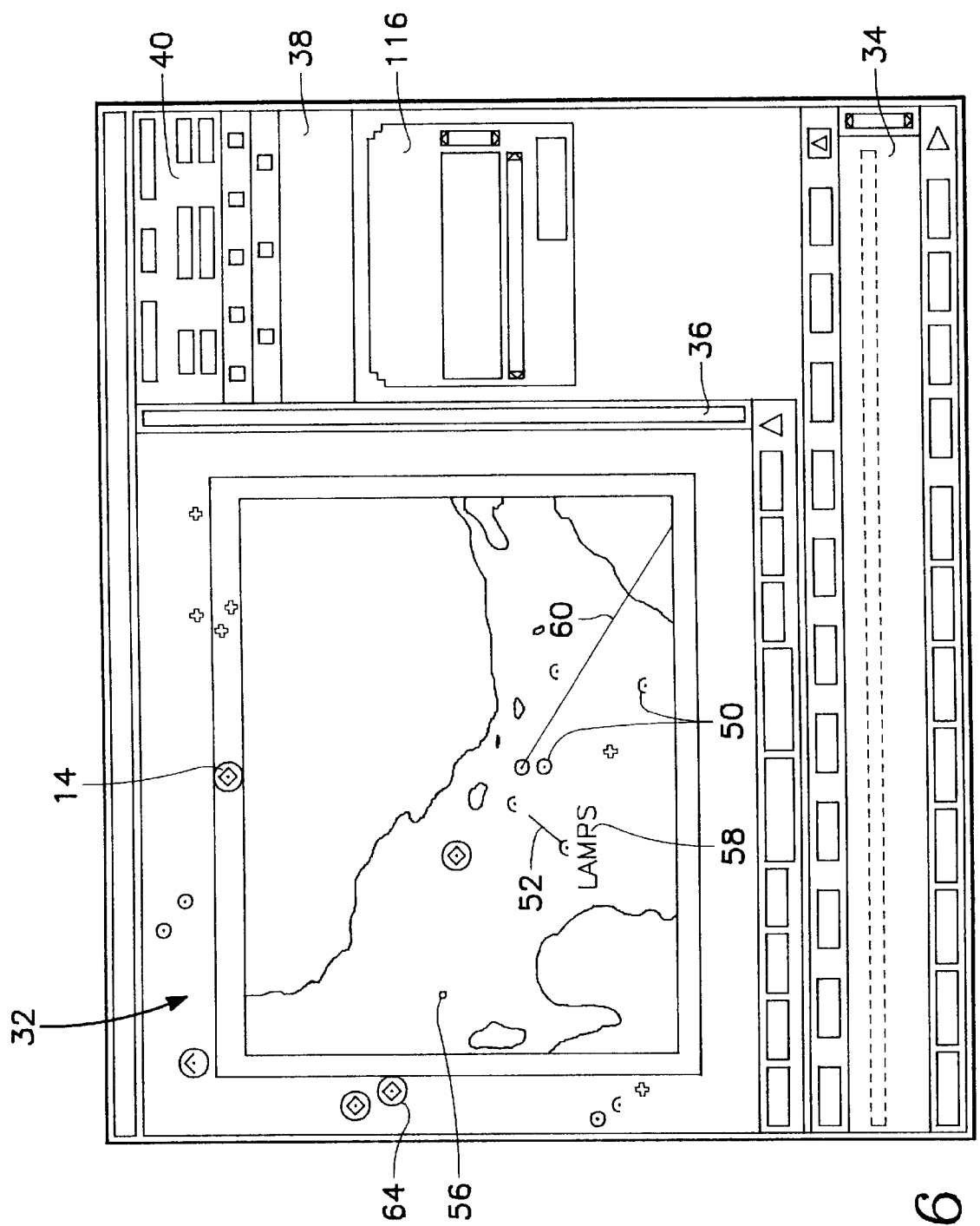
FIG. 6 illustrates example symbol function features of the map frame region of the present invention.

FIG. 6 illustrates example symbol function features of the map frame region of the present invention. The operator 28 may select any number of symbol features that are appended to the symbols or used to change the attributes of the symbols. These features may be applied globally (for example with the use of an All Symbols function located in the pull down menu bar to change all the symbols), in groups (for example with the use of an All Unknown Aircraft function located in the pull down menu bar to change the symbols in the unknown aircraft group) or uniquely to a particular symbol representing a specific track.

In addition, these features may be applied conditionally for cases such as speed increases above a certain threshold or previously selected. Some example symbol functions for the map frame region 32 include, a symbol icon 50, a speed leader 52, a bearing drift leader (not shown), a history dot 56, a symbol tag 58, bearing lines 60 and pairing lines 121 (shown below in FIG. 21), a selection circle 64 and a pointer box (not shown) described in detail below in FIG. 21.

A symbol icon 50 reduces symbols in size to a small dot with color coding to match the full symbol. Under certain conditions, such as the selection of the symbol, the symbol will return to full size.

A speed leader 52 is a line which originates from a symbol. The length of the line is proportional to the velocity of the track. The direction of the line is a function of the direction of travel of the track. Speed leaders 52 are applicable only to tracks for which the position and movement are known.

A bearing drift leader is a line which originates from a symbol. The length of the line is proportional to the time rate of change of bearing. The direction of the line is perpendicular to a line drawn between the sensor reporting the track and the symbol representing the track. Bearing drift leaders are applicable to any track for which the bearing is known.

A history dot 56 is a small dot that is left behind a symbol when it is moved. As such, history dots 56 act as footprints leading back to prior symbol positions. History dots 56 are applicable to all track symbols.

A symbol tag 58 is alphanumeric information that is displayed adjacent to a symbol and remains with the symbol during any symbol movement. Symbol tags 58 may consist of any of the elements of the track file entry representing the track, such as altitude or track number, or may be originated by the user such as radio call sign.

Bearing lines 60 are lines originating in a symbol or point in a particular frame and extending to the outermost edge of the geo-situational window 42, passing through some other point in another frame or along a given bearing. Bearing lines 60 are used to provide a graphical representation of events or situations such as the line of flight of a weapon, the bearing of electromagnetic radiation or the course from one point to another.

All-Track Worksheet

Figure 7:
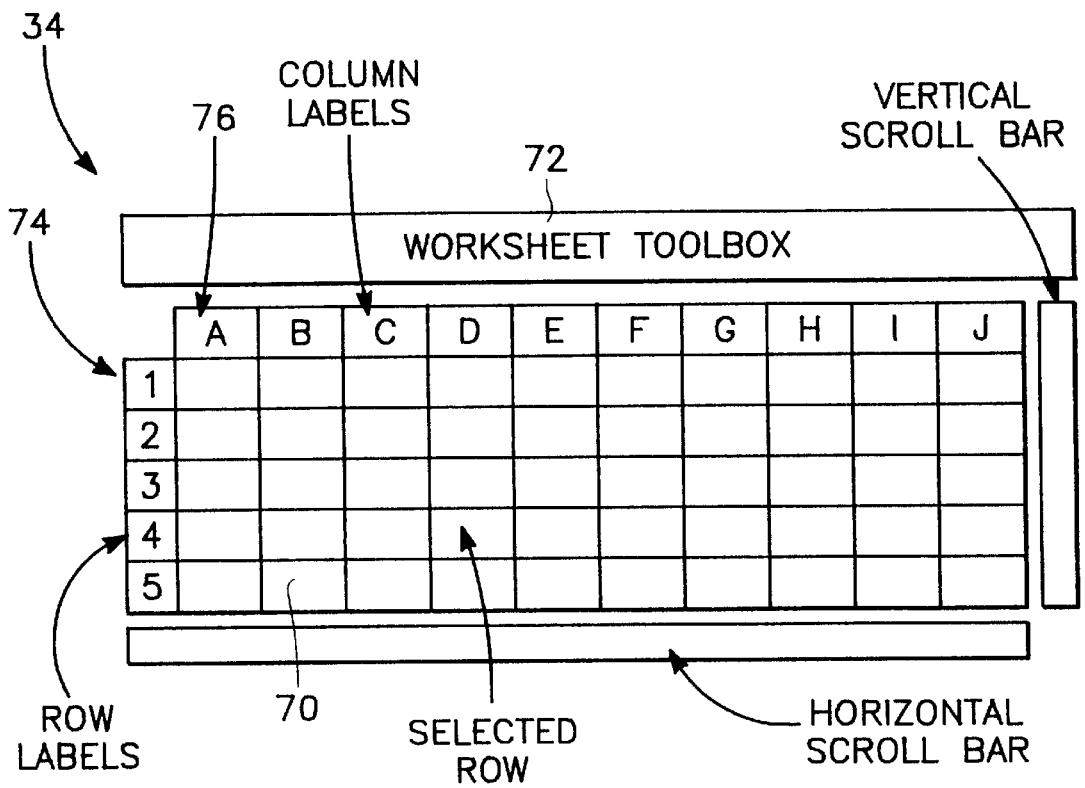
FIG. 7 is a detailed view of a worksheet window of the all-track worksheet of FIG. 2.

FIG. 7 is a detailed view of a worksheet window of the all-track worksheet of FIG. 2. The worksheet window 34 displays data, such as track files or other library-like data, located in the databases, in tabular format. The worksheet window 34 is composed of two major elements, the worksheet 70 itself and the worksheet toolbox 72. It should be noted that the orientation and positioning of the worksheet 70 and the worksheet toolbox 72 can be customized to the operator's preferences. The operator 28 may configure worksheet views of subsets of the database.

The worksheet window 34 is structured preferably as a spreadsheet with rows 74 and columns 76 in horizontal format. Each row 74 contains all the known characteristics or elements that define an entity or track. Each column 76 contains like characteristics that compose each entity or track. The individual characteristics of each track are located in cells, which are defined by the intersections of rows and columns. At least one worksheet view will always contain all tracks. The attributes of a particular worksheet view, which control the organization of the particular worksheet as well as its contents, are stored by the software 20 and cataloged under the filter name, or name of the particular worksheet.

Figure 8:
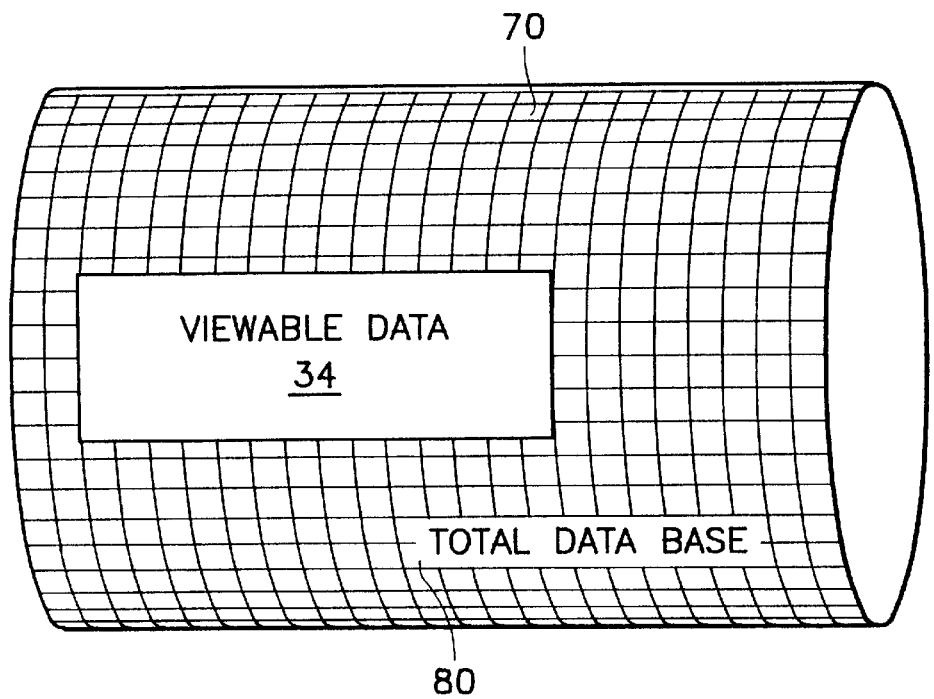
FIG. 8 is a single page containing all of the tracks and their elements located in an imaginary horizontal cylinder.

Database characteristics of the tracks may be selected by the operator 28 or by the software 20 automatically. Selection by the operator 28 involves any number of possible cursor or keyboard actions. The worksheet 70 may be much larger than the window 34 through which it is viewed. For example, a single page containing all the tracks and their elements can be located in an imaginary horizontal cylinder 80 as shown in FIG. 8.

Figures 9, 10, 11:
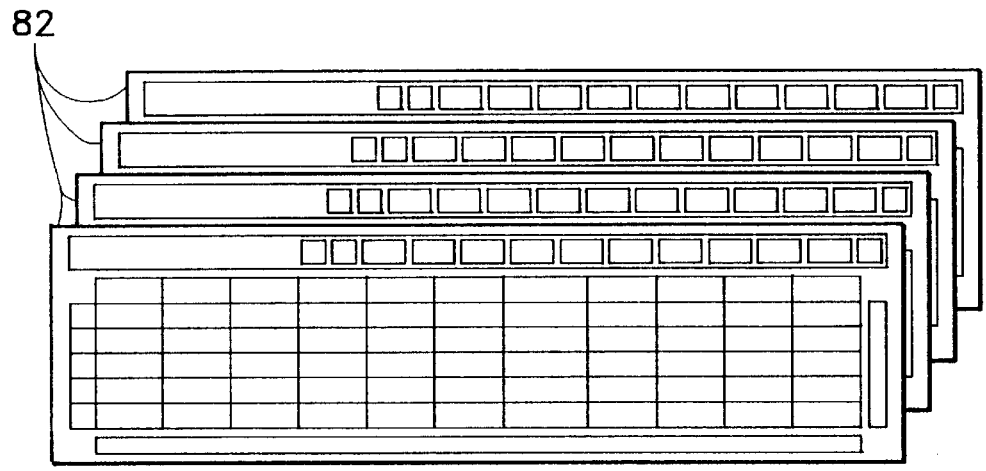
FIG. 9 is a series of worksheet layers directly stacked one on top of the next layer.
FIG. 10 is a standard view worksheet of the all-track worksheet of FIG. 2.
FIG. 11 is a composite view worksheet of the all-track worksheet of FIG. 2.

FIG. 9 is a series of worksheet layers directly stacked one on top of the next layer. Similar to that of the frames in the geo-situational window area 42, worksheet views may be configured and stored for later recall by the operator 28 or the software 20. Due to the two-dimensionality on the display, only one worksheet 70 may be open or viewed at one time on the primary display 27. However, the operator may create filters for multiple worksheet instantiation views 82 for alternating between views. The multiple worksheet instantiation views 82 comprise a series of worksheet layers directly stacked one on top of the next as illustrated in FIG. 9. When a different filter view is selected, the selected worksheet is moved to the front surface of the worksheet window area 34.

Basic Worksheet Functions

Referring back to FIG. 7, the view of track characteristics in the database may be varied, moved or otherwise controlled by the operator 28 or the software 20 automatically. Typical functions of conventional spreadsheet worksheets can be implemented. The worksheet functions of the present invention preferably include a vertical scroll/vertical page function, a horizontal scroll/horizontal page function, a column reorganization function, a row sorting function, a row freezing function, and a column freezing function.

The vertical scroll/vertical page function varies the operator's 28 view through the worksheet window 34 one row 74 at a time, by scrolling, or by paging the height of the window. Referring back to FIG. 8, the database cylinder can be rotated in either direction relative to the viewable window 34.

The horizontal scroll/horizontal page function varies the operator's view through the worksheet window 34 one column 76 at a time, by scrolling, or by paging the width of the window. Referring to FIG. 8, the database cylinder can be translated either left or right relative to the viewable worksheet window 34.

The column reorganization function organizes the order of the columns 76 in the viewable window under operator or application control, to provide specific data in preferred order for specific operator tasks. Multiple organizations may be created and recalled.

The row sorting function sorts the order of the rows 74 in the viewable window under operator or application control to provide specific data in preferred order for specific operator tasks. The view of the data base may be sorted by single column values or by nested sorts of column values.

The row freezing function allows selected rows to be frozen in the viewable window under operator or application control. Rows which are frozen remain in the viewable window when the data base cylinder is rotated.

The column freezing function allows selected columns to be frozen in the viewable window under operator or application control. Columns which are frozen remain in the viewable window when the data base cylinder is moved left or right.

Worksheet Forms

FIG. 10 is a standard view worksheet. FIG. 11 is a composite view worksheet. Worksheets may take one of two forms depending on their specific use, a standard worksheet 83 and a composite worksheet 84. Referring to FIG. 10, a standard worksheet 83 is a worksheet in which each cell, such as cells 85, 86, 87, in a given column 88 is identical in type and format and each row 90 visible in the worksheet has the same number of columns. Standard worksheets 83 are used to view data which comes from the same database or from databases of identical format.

A composite worksheet 84 is a worksheet in which the number of columns 92, 93, 94 in all the rows 95, 96 are not equal. One or more of the rows 95 originates from one data source and is a reference. Remainder rows 96 originate in another source and are used for comparison.

Worksheet Toolbox

FIG. 12 is a detailed view of the worksheet toolbox of the all-track worksheet of FIG. 2. Some worksheet functions are controlled directly and immediately by the operator 28 using the worksheet toolbox 72. For example, common worksheet toolbox components 98, as shown in FIG. 12, are components of the worksheet toolbox 72 that are common to all worksheets 70. The common worksheet toolbox components 98 can include the name of the worksheet view, as well as tools to control column movement, freezing of rows, and the storing of the configuration as desired by the operator 28.

There are special worksheet toolbox components that relate to the type of worksheet in view. Special worksheet toolbox components vary with the worksheet view and its intended use. For example, one type of special worksheet toolbox component can be vehicle track 100.

Priority Navigator

Figure 13:
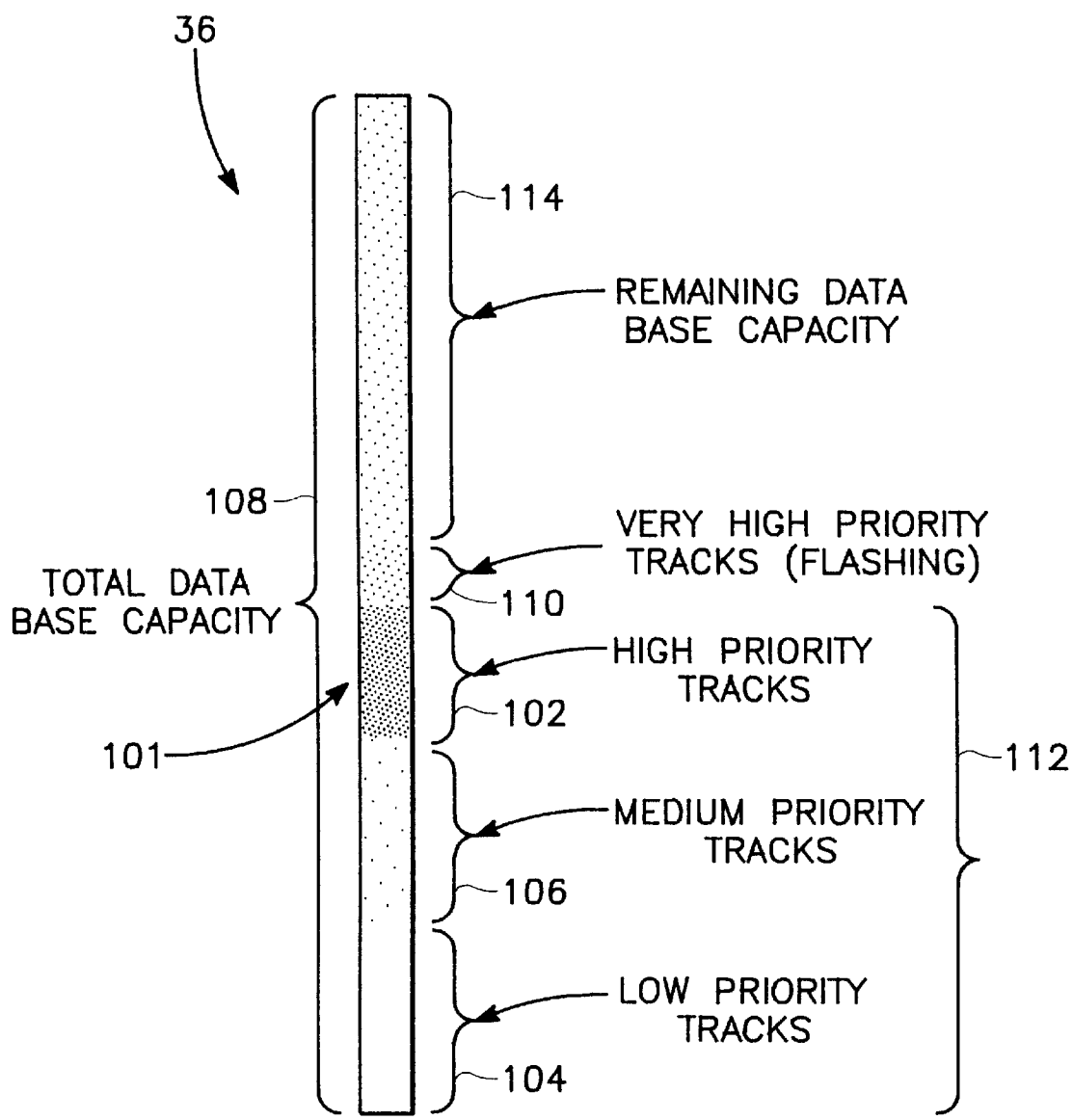
FIG. 13 is a detailed view of the priority navigator of the graphical user interface of FIG. 2.

FIG. 13 is a detailed view of the priority navigator of the graphical user interface of FIG. 2. The priority navigator 36 displays the data in the database in priority format (i.e. a prioritized graphical in-basket). Based on system functions, the database entities or tracks are prioritized 101 by the software 20 for operator 28 attention or action. Thus, the priority navigator 36 allows the operator 28 to visualize the priority of track attention and to aid in managing the operator's 28 workload relative to the priority of the task.

The priority navigator 36 is structured as a vertical thermometer type display. In other words, the relatively higher locations 102 have relatively higher priority, the relatively lower locations 104 have relatively lower priority, and the locations in the middle 106 have relatively moderate priority. The total height 108 of the thermometer type display is proportional to the total database or track file capacity.

Each of the database entities or tracks 14 is grouped based on system determined priorities for operator 28 attention. Groupings are preferably color coded to indicate priority from lowest 104 to highest 110. For example, very high priority tracks 110 can be a flashing red color, high priority tracks 102 can be a steady red color, medium priority tracks 106 can be a steady yellow color, and low priority tracks 104 can be a steady green color. The total height 108 of the priority navigator indicates the relative size of the database, the total height 112 of all the color coded columns indicates the total number of tracks in the database, and the remaining height 114 above the color coded columns indicates the remaining capacity of the database.

Utility Area

Referring back to FIG. 6, the utility window 38 on the graphical user interface 26 provides a workspace for operator 28 or system required dialog boxes 116 or auxiliary displays for performing special focus tasks, such as finding triangulated tracks (described below) or modifying the attributes of various symbols. The utility area 38 provides a practical workspace without cluttering or blocking other window areas, such as the map frame region 32, all-track worksheet 34, or the priority navigator 36. The utility window 38 can also contain sub-windows that continuously display important system functions, such as system equipment status.

Status Area

The status window area 40, as shown in FIG. 6, is reserved for various data such as date and time, and other information relating to the operator's own track, such as position, latitude, longitude, course, and speed of the operator's own track. Also, relative wind direction, speed, and the status of the operator's own equipment can be displayed. The various data displayed by the status window area 40 will vary depending on the system and setup used.

Operation

The operation of the graphical user interface 26 of the TAMDRS 10 supports a human operator's 28 cognitive function. The program allows the operator to remain totally aware of her tactical situation while performing normal tasks or other special function tasks or special focus tasks. As described above, the tracks 14 can be displayed in a graphical format with the map frame region 32, tabular format with the all-track worksheet 34, or priority format with the priority navigator 36.

Window Area Integration

Figure 14:
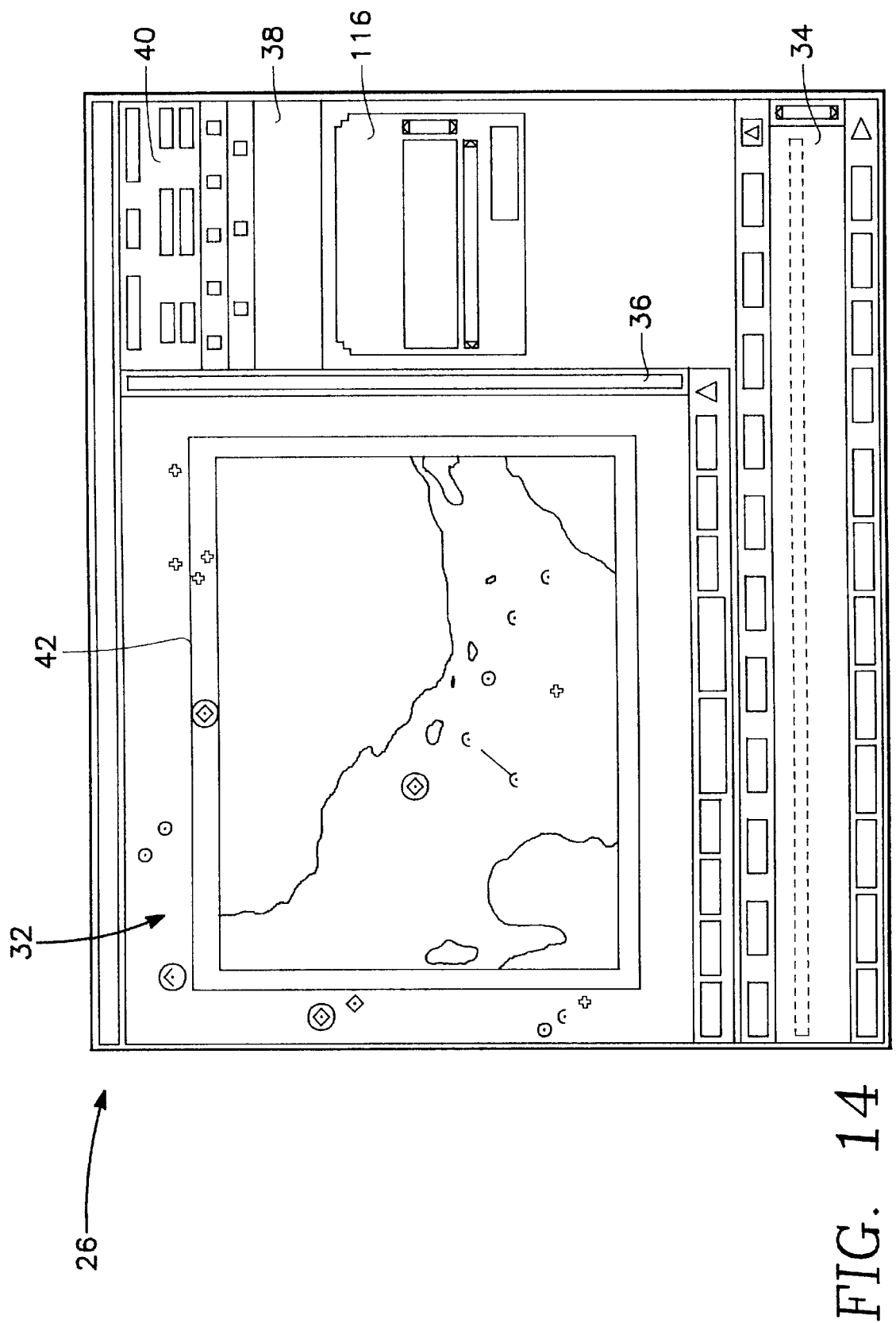
FIG. 14 illustrates the integration of the geo-situational, worksheet, priority navigator, and utility windows on the graphical user interface of FIG. 2.

FIG. 14 illustrates the integration of the geo-situational, worksheet, priority navigator, and utility windows on the graphical user interface through selection of a track. The four major windows, the map frame region window 32, the worksheet window 34, the priority navigator window 36, and the utility window 38, are always present on the graphical user interface 26 of the primary display 27. It should be noted that the proportions of each window may be determined by overall application usage.

For example, to support a more graphically intense system, the geo-situational window 42 of the map frame region 32 may be enlarged with the necessary reduction in size of the remaining three windows 34, 36, 38. Alternatively, to support a system which is data intensive, the worksheet window 34 may be enlarged in size with the attendant size reduction and reorientation of the remaining three major windows 32, 36, 38.

Further, when instantiated on the primary display, the four major windows are tiled as shown in FIG. 14, with each window 32, 34, 36, 38 constrained its own dedicated area. The tiled constraint, which inhibits the overlapping or cascading of these windows, prevents one window from occluding tactically significant information on another.

Track Selection

Figure 15:
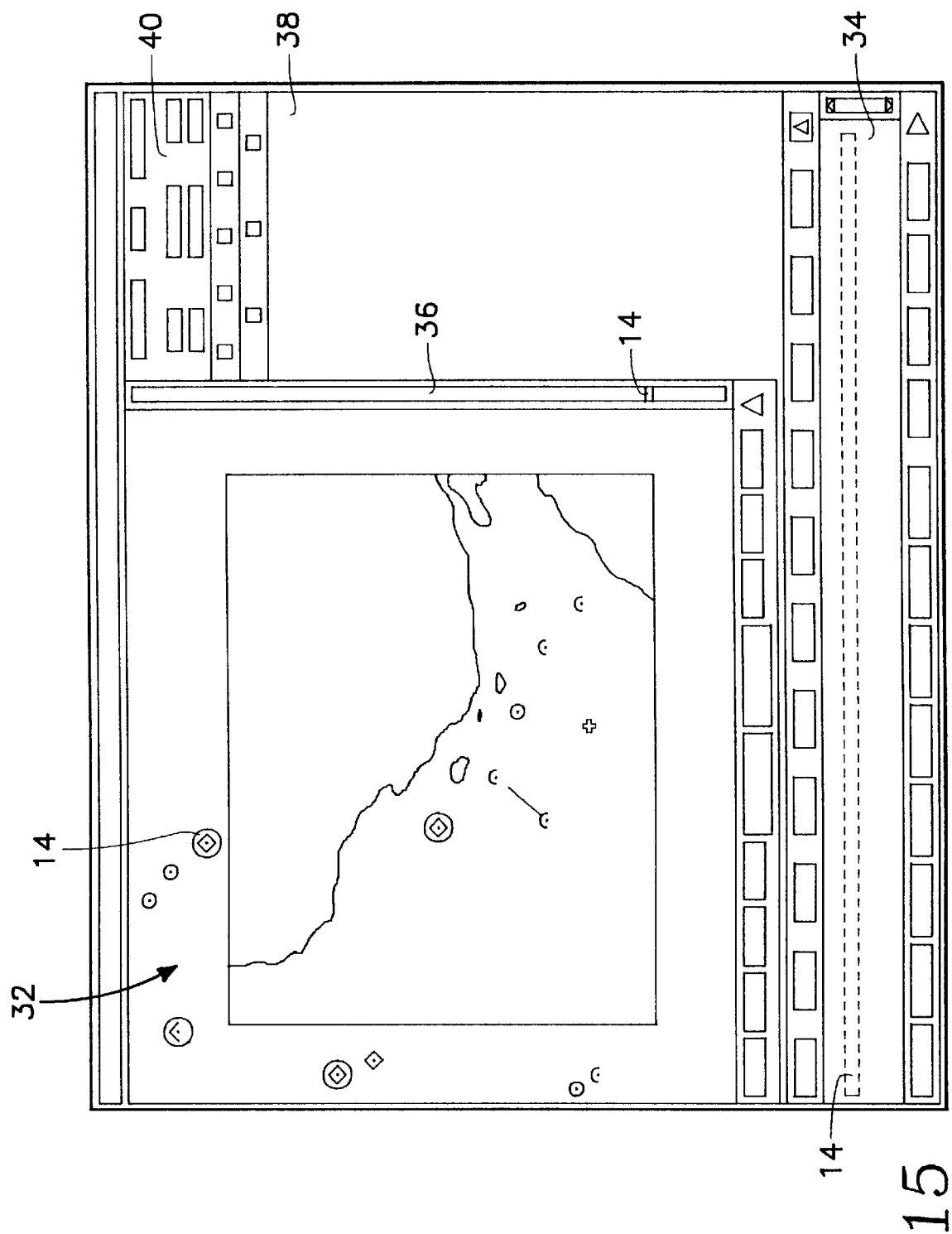
FIG. 15 illustrates a selected track in the geo-situational window, the all-track worksheet, and the priority navigator.

FIG. 15 illustrates a selected track in the geo-situational window, the all-track worksheet, and the priority navigator. Tracks 14 may be selected by either the operator 28 or the software 20 in either the map frame region window 32, the worksheet window 34, or the priority navigator window 36. In addition, the use of certain dialog boxes or windows in the utility window 38 causes the selection of tracks 14.

Each track 14 in the map frame region window 32 is identified by a predefined symbol (as discussed above) and provides certain characteristics of the track 14 for the operator's 28 use. Additional characteristics of the track 14 can be obtained by hooking or selecting the track 14 while in the map frame region window 32. Hooking the track 14 in the map frame region 32 highlights the track 14 in the all-track worksheet 32 and the priority navigator 36, since all three areas are integrated. Similarly, hooking the track 14 in the all-track worksheet 34 highlights the track 14 in the map frame region 32 and the priority navigator 36.

Referring back to FIG. 13 along with FIG. 15, whenever the operator 28 has selected a track 14 from the database (via the map frame region 32 or the all-track worksheet 34), the track's 14 priority position 101 in the current database is shown as a colored band in the priority navigator 36. Also, database tracks or entities may be selected from the priority navigator 36 by various cursor or keyboard actions. The priority navigator 36 alerts the operator 28 of a particular track's 14 priority so that an operator's 28 to do list can be organized relative to the priority of the task that needs to be accomplished.

Further, certain level of priority tracks can be selected by hooking the certain priority level 102, 104, 106, 110 of the color coded column. For example, the highest priority tracks are selected by hooking the color coded column designated as the highest priority level 110. When the desired priority level is hooked, a display alerts the operator 28 of all the tracks in that priority level. The operator can be alerted with, for example, a dialog box 116, as shown in FIG. 14, having all the tracks shown in a predetermined symbol format.

Figure 16:
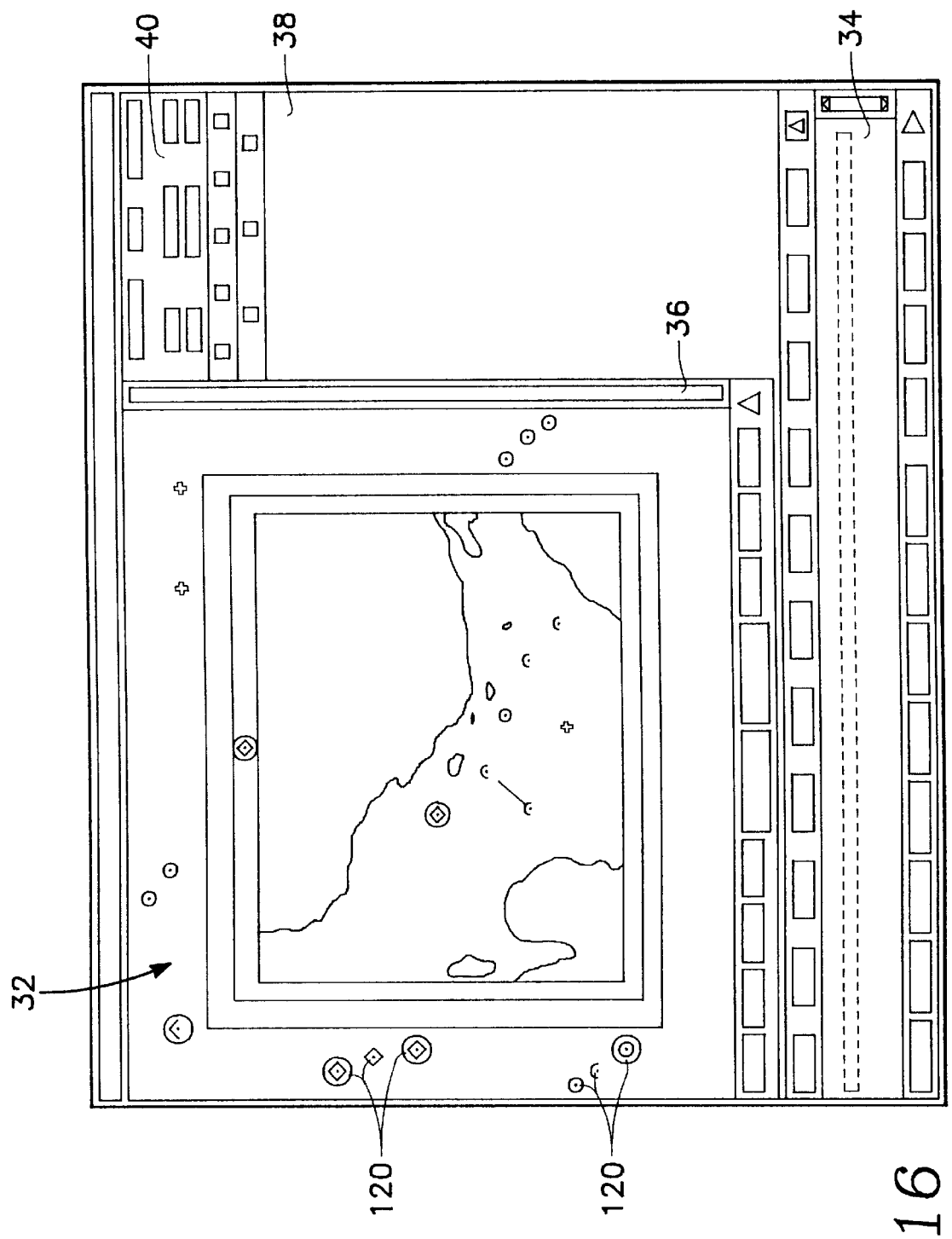
FIG. 16 illustrates multiple tracks being hooked together with a multiple hook function.
Figure 17:
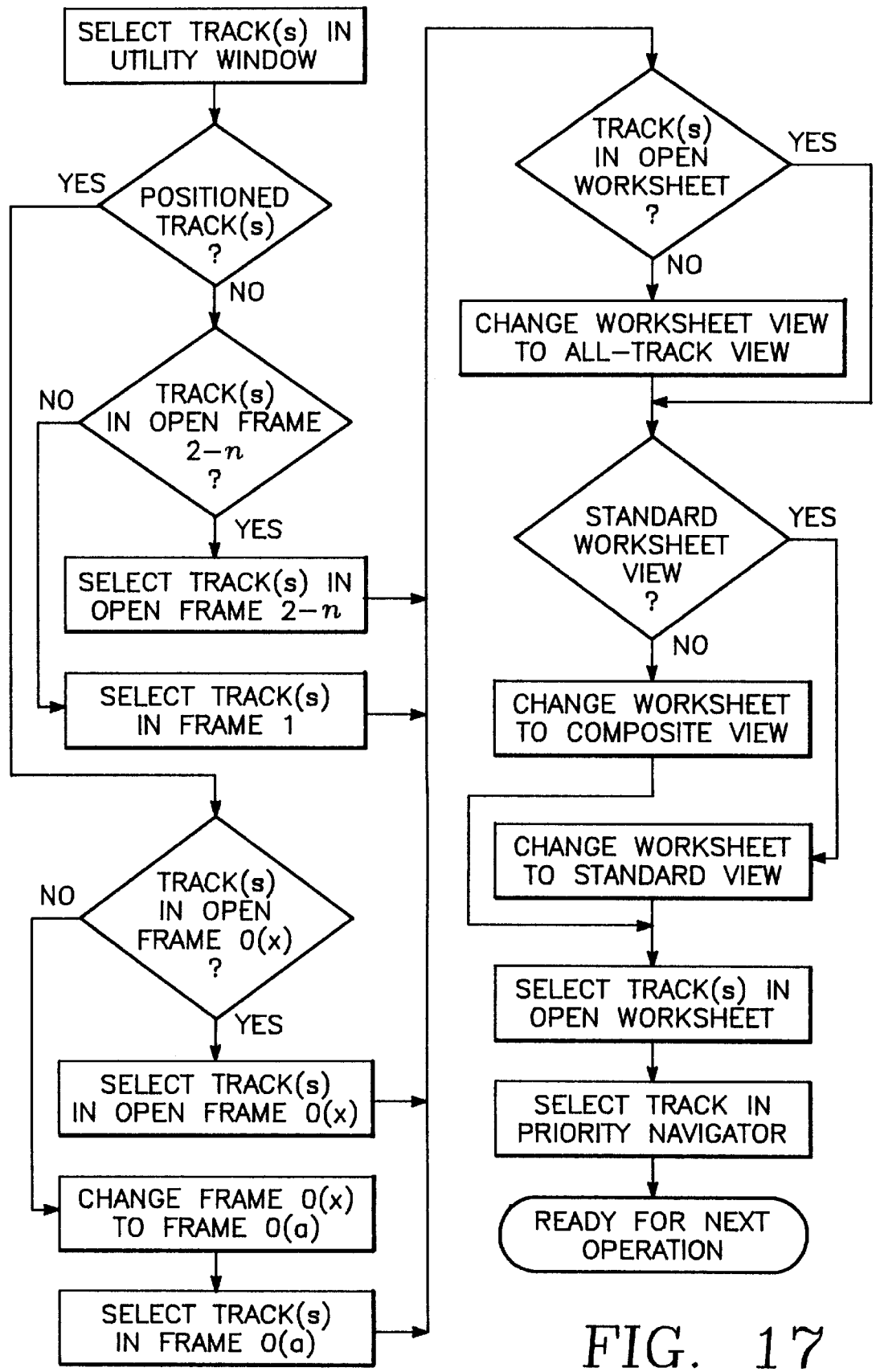
FIGS. 17 is top-level flow chart describing in detail the family of rules constraining the selection of tracks from the utility window.
Figure 18:
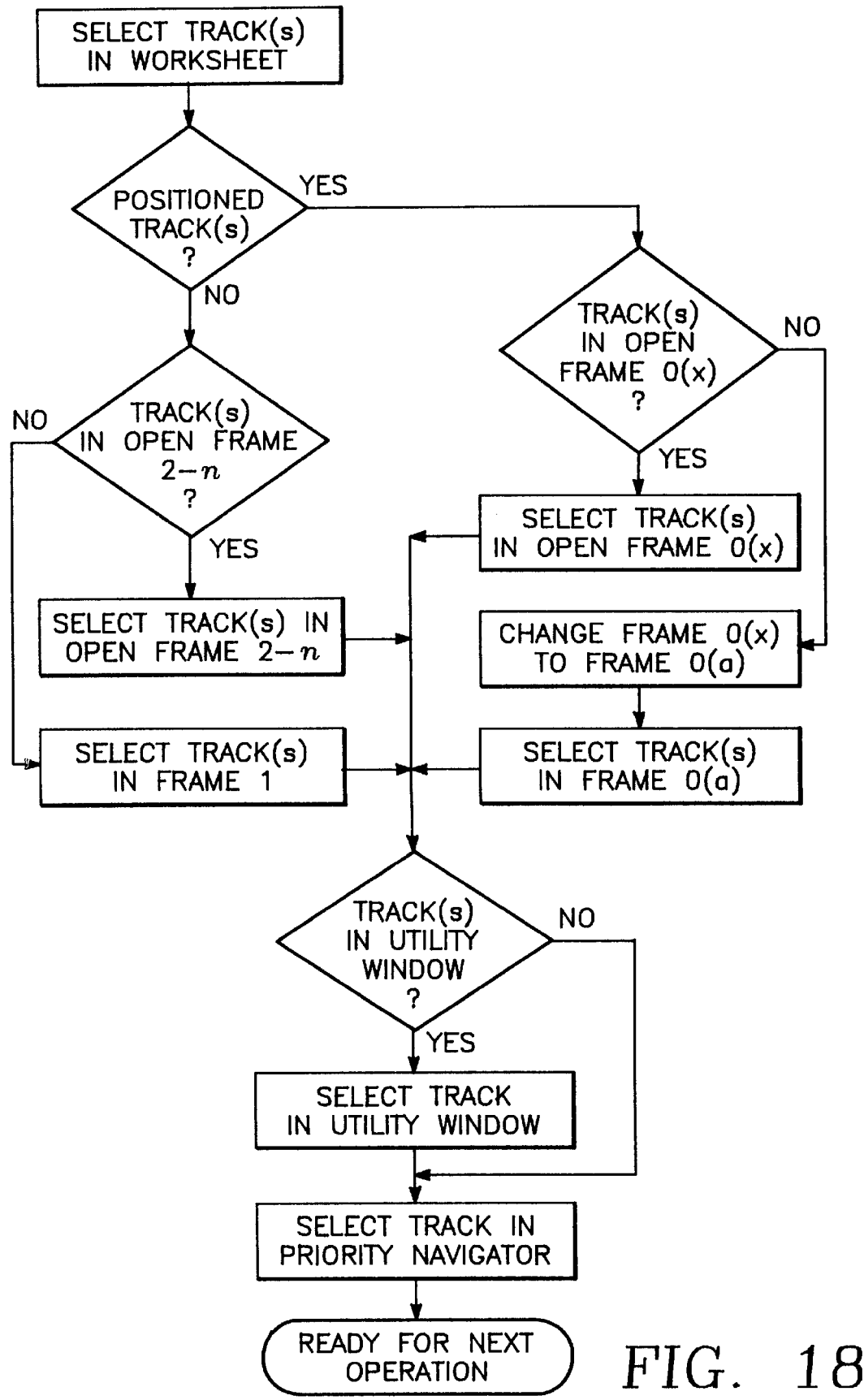
FIG. 18 is top-level flow chart describing in detail the family of rules constraining the selection of tracks from the worksheet window.
Figure 19:
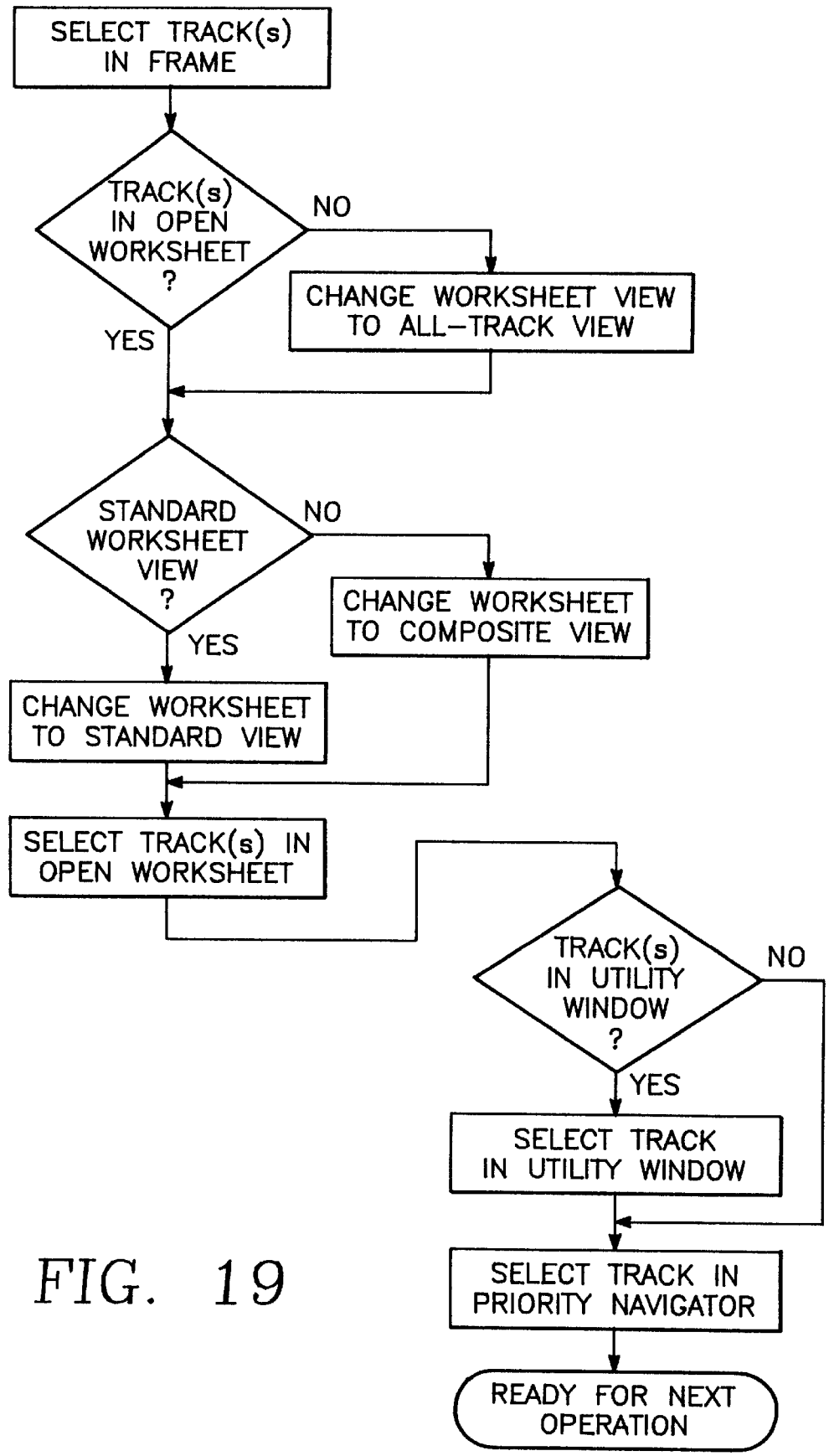
FIG. 19 is top-level flow chart describing in detail the family of rules constraining the selection of tracks from the geo-situational window.
Figure 20:
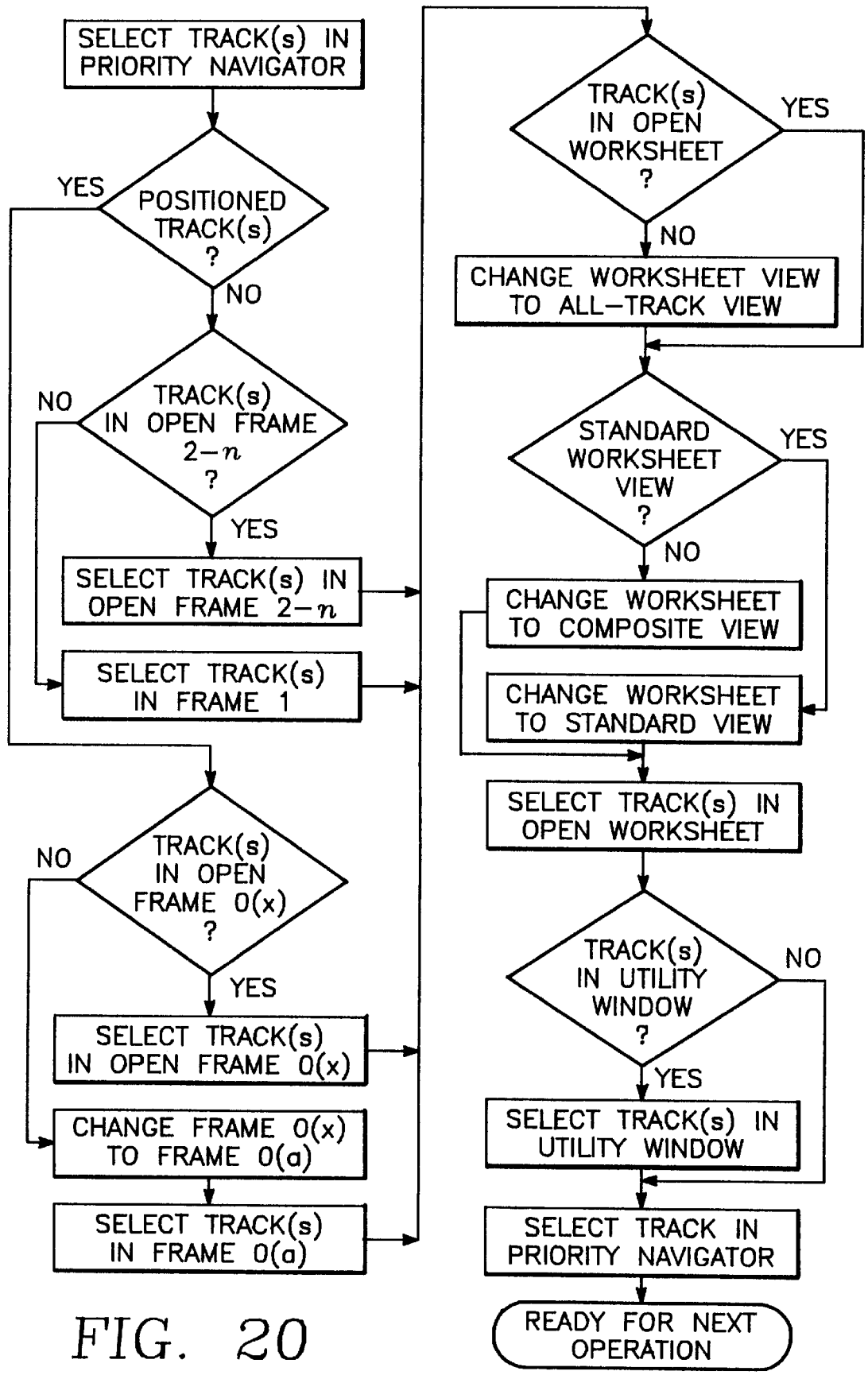
FIG. 20 is top-level flow chart describing in detail the family of rules of tracks from the priority navigator.

Also, referring to FIG. 16, multiple tracks 120 can be hooked together with a multiple hook function. This allows the operator 28 to compare and contrast parametric information of multiple tracks 120 by placing interesting tracks in rows one on top of the other and aligning like values. For analysis purposes, multiple track placement increases operation efficiency and provides category organization.

Whenever a track or multiple tracks are selected by the operator 28, a selection circle is shown surrounding the symbol or symbols representing the track or tracks. The selection circle indicates to the application that the operator 28 is pointing to the encircled track or tracks and provides visual feedback to the operator 28 that the system has acknowledged the selection.

Whenever a track or multiple tracks are selected by the application, a square or pointer box is shown surrounding the symbol or symbols representing the track or tracks. The pointer box indicates to the operator that the application is pointing to the boxed track or tracks.

Since the selection of a track 14 in any one window causes the selection of the track 14 in all windows 32, 34, 36, a family of rules applies. The family of rules are imposed to prevent or minimize the disruption of the operators cognitive processes. FIGS. 17 through 20 are top-level flow charts describing in detail the family of rules constraining the selection of tracks from the utility window 38, the worksheet window 34, the map frame region window 32, and the priority navigator window 36, respectively.

Therefore, referring back to FIGS. 14-16 along with FIGS. 17-20, the operator 28 can work with tracks and accomplish his tasks by using the graphical display (map frame region 32), the tabular display (all-track worksheet 34), and the priority display (priority navigator 36) together or individually. In addition, as described above, these displays are tiled on the screen, with the exception of short term dialog boxes 116 for lower level selections. Thus, working in a long-term window, such as the geo-situational window 42, will not cover or obstruct occurrences or tracks on the map frame region 32 that would otherwise be tactically significant.

Figure 21:
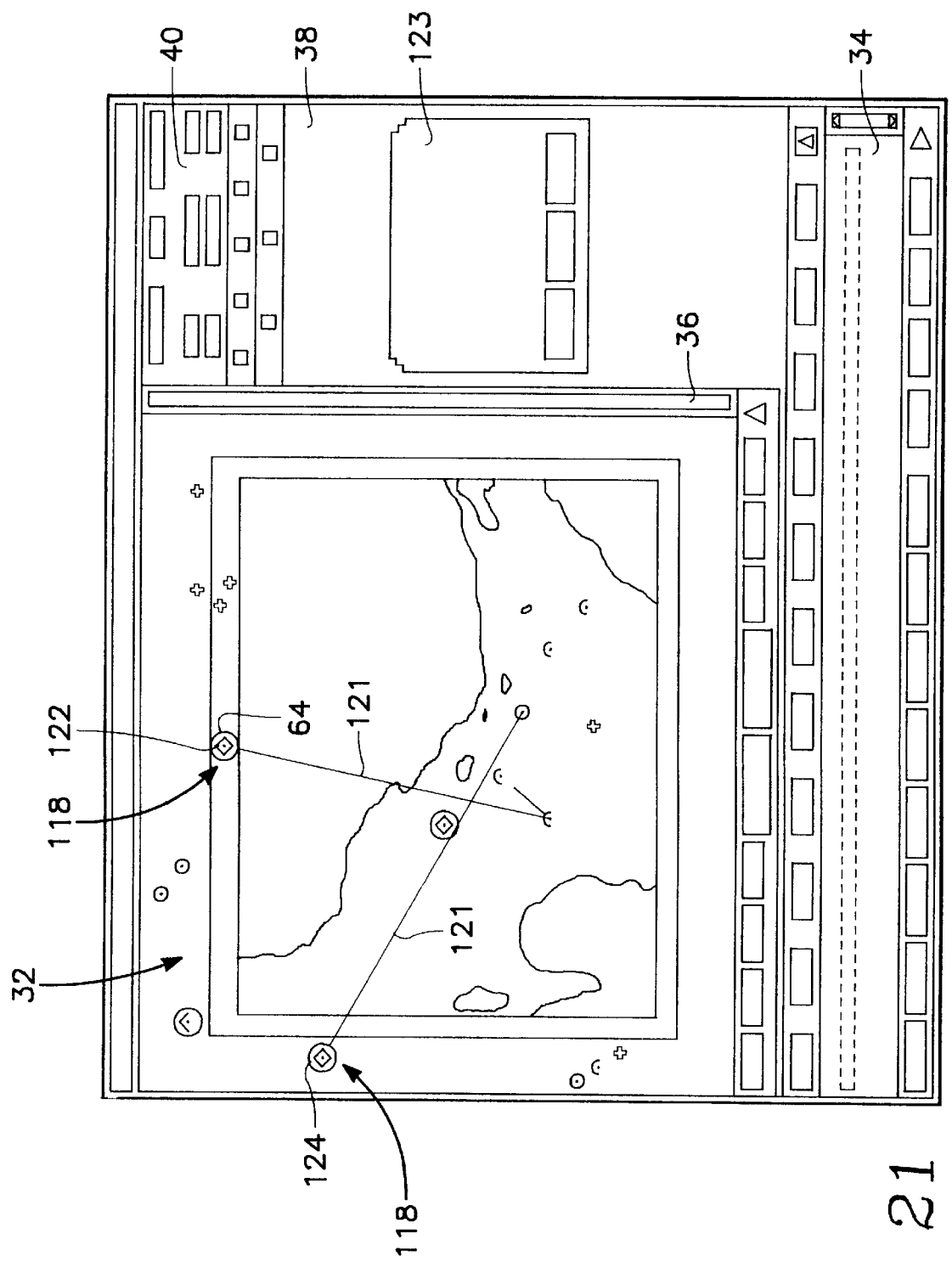
FIG. 21 illustrates triangulation candidates, bearing lines, and track symbol features of the graphical user interface of FIG. 2.

FIG. 21 illustrates triangulation candidates, pairing lines, and track symbol features of the graphical user interface of FIG. 2. Potential triangulation candidates 118 are determined by analyzing an emitter that is being held by two or more sources. Pairing lines 121 from the sources cross in real space where the emitter is located. A pairing lines connects two or more track symbols in any frame or frames. Pairing lines 121 are used to graphically display some interrelationship between the tracks represented by the symbols.

During triangulation candidate determination, a dialog box 123 appears in the utility area 38 to alert the operator 28 that the selected track is connected to a reporting unit. This function finds a parametric and geometrically possible match between two tracks 122, 124, each held by two different sensors, and places the tracks in the worksheet. The operator can now look at the placed data to determine whether a valid triangulation was selected.

Use of Secondary Monitors or Graphics Displays

Figure 22:
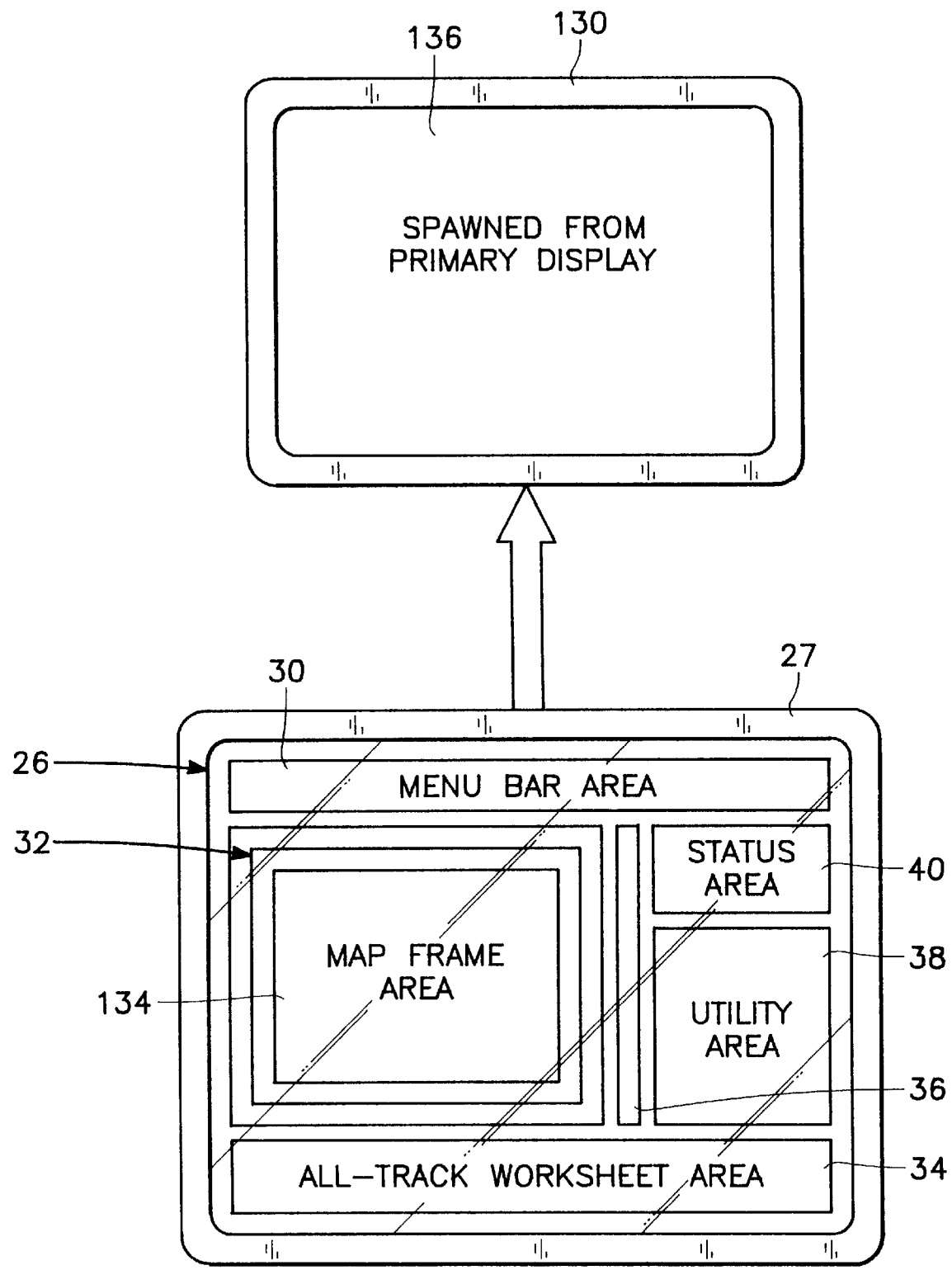
FIG. 22 illustrates the integration of a secondary monitor with the primary monitor.

FIG. 22 illustrates the integration of a secondary monitor with the four major window areas. Each of the four major windows (the map frame region window 32, the worksheet window 34, the priority navigator window 36, and the utility window 38), in addition to the capabilities described above, can be replicated on one or numerous secondary displays, such as secondary dispay 130, at the discretion of the operator 28 or the software 20. Either the operator 28 or the software 20 "sends" any visible window to the secondary display 130.

The attributes of the particular window to be sent to the secondary display 130 are retained during the transition. However, window organization and window attribution rules applied to the particular windows sent to the secondary display 130 are much less rigid once displayed on the secondary display 130 than the rules of the primary display 27 discussed above.

With regard to window organization rules, contrary to the rules imposed on the primary display 27, windows on the secondary display 130 may be cascaded. The replication of the windows may be re-sized and duplicated by either the operator 28 and the software 20. Windows may be cascaded or iconified as required.

With regard to window attribute rules, the filter view of a window 134, that is the selected portion of the database that is displayed and its form, is copied, at the time in which the window 134 is replicated, on a secondary display 130. As a result, a new window 136 displayed on the secondary display 130 will exhibit the identical physical properties of the original window 134 on the primary display 27. Once the new window 136 is on the secondary display 130, the operator 28 can change any of the attributes of the new window 136 on the secondary display 130 without affecting the original window 134 of the primary display 27.

Further, tracks on the secondary display 130 can be hooked independently from the tracks on the window 134 of the primary display 27. This allows the operator 28 to, for instance, to select several high interest tracks and leave them hooked or selected on one display and apply special functions and changes to the other display.

In addition, the operator 28 may create any reasonable number of copies of windows on the secondary display 130 from the primary display 27. This is shown in the following examples. Example 1: The operator selects ten tracks of interest in the geo-situational window. The ten tracks would also be selected in the primary worksheet window. Since the physical size of the worksheet window is smaller than the available space, the operator "sends" the worksheet to the secondary display.

When the copy or "child" of the worksheet arrives on the secondary display, it is identical to its "parent" on the primary display. Once on the secondary display, the operator may expand the "child" window vertically to view all ten selected rows of the original worksheet. Once a window has been spawned to a secondary display, both the "parent window" and any "children" windows become independent viewers of the database or track file. The operator may send any reasonable number of copies of his current geo-situational window to the secondary display. Each successive copy would be cascaded.

Example 2: The operator chooses to "send" his current geo-situational window to the secondary display. At the time, the "parent" window has one positioned track frame (Frame 0(a)) with a filter view of all positioned tracks, a width of 256 nautical miles, and one rangeless frame (Frame 1) with a filter view of all rangeless tracks. Once the geo-situational window is spawned on the secondary display, the operator is free to change any of the attributes of either the "parent" or the "child" independently.

The operator 28 may choose to change the range of a frame of the primary ("parent") to 32 nautical miles. The "child" will retain its original width of 256 nautical miles. The operator may send any reasonable number of copies of the current worksheet of the primary window to the secondary display. Each successive copy would be cascaded. The above merely describes two basic examples for illustrative purposes only.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. An electronic awareness system for evaluating, monitoring, and controlling, in real time, an outside environment having entities and occurrences with characteristics, said electronics awareness system comprising:

input sensors for receiving real-time data produced by said entities and occurrences and for providing input data indicative of said characteristics of said entities and occurrences;

a computer having memory, said computer coupled to said input sensors and receptive of said input data, wherein said input data being stored in said memory;

wherein said computer being preprogrammed to access said database containing said input data, process said data into readable data, and monitor, evaluate, and perform computer manipulation of said input data;

an interface for interfacing a reader with said computer in real-time, wherein said reader is provided with said readable data in a geo-situational format from said computer for reader monitoring, reader evaluation, and reader manipulation of said readable data; and output reactors coupled between said computer and said input sensors for receiving said computer manipulations of said input data and said reader manipulation of said readable data for physically manipulating said environment.

2. The invention as set forth in claim 1, wherein said reader is a user and said interface is a graphical user interface for displaying said readable data to said user in user readable format so that said user monitors, evaluates, and provides manipulation of said readable data to said computer in real-time for physically manipulating said environment.

3. The invention as set forth in claim 2, wherein said graphical user interface further comprises display object functions for providing event driven functionality to said user.

4. The invention as set forth in claim 3, wherein said graphical user interface further comprises menu control bar functions with pull down window functions for providing event driven functionality to said user.

5. The invention as set forth in claim 2, wherein said graphical user interface further comprises a geo-situational function for displaying, monitoring, and allowing said user to manipulate said readable data graphically.

6. The invention as set forth in claim 5, wherein said geo-situational function further comprises at least one nested frame function for displaying, monitoring, and allowing said user to manipulate said readable data.

7. The invention as set forth in claim 6, wherein said nested frame function comprises at least one map chart frame function for dynamically representing actual positions and motions of said entities and occurrences of said environment in real-time for displaying, monitoring, and allowing said user to manipulate said readable data.

8. The invention as set forth in claim 6, wherein said nested frame function comprises at least one rangeless frame function for dynamically representing actual directions and bearings of said entities and occurrences of said environment in real-time for displaying, monitoring, and allowing said user to manipulate said readable data.

9. The invention as set forth in claim 5, wherein said geo-situational function further comprises a plan position indicator function for indicating actual positions and motions of said entities and occurrences of said environment in scaled relationship with respect to one another so that said scaled relationship is displayed and monitored for allowing said user to manipulate said readable data.

10. The invention as set forth in claim 5, wherein said geo-situational function further comprises a filtering function for filtering certain entities and occurrences of said environment to derive desired characteristics of said entities and occurrences so that only said desired characteristics are displayed and monitored for allowing said user to manipulate said readable data.

11. The invention as set forth in claim 5, wherein said geo-situational function further comprises a symbol function for symbolizing certain entities and occurrences of said environment so that said certain entities and occurrences are displayed and monitored in symbolic format for allowing said user to manipulate said readable data.

12. The invention as set forth in claim 2, wherein said graphical user interface further comprises a worksheet function, with sub-functions, for displaying, monitoring, and allowing said user to manipulate said readable data tabularly.

13. The invention as set forth in claim 12, wherein said worksheet function further comprises a filtering function for filtering certain entities and occurrences of said environment to derive desired characteristics of said entities and occurrences so that only said desired characteristics are displayed and monitored for allowing said user to manipulate said readable data.

14. The invention as set forth in claim 12, wherein said worksheet function further comprises a toolbox function containing certain desired sub-functions so that said certain sub-functions are displayed and monitored for allowing said user to manipulate said readable data.

15. The invention as set forth in claim 2, wherein said graphical user interface further comprises a utility function for displaying, monitoring, and allowing said user to manipulate said readable data functionally.

16. The invention as set forth in claim 15, wherein said utility function further comprises a sub-window function for continuously displaying desired information of said entities and occurrences of said environment for allowing said user to manipulate said readable data.

17. The invention as set forth in claim 2, wherein each of said entity and occurrence has predetermined priority data according to said characteristics of each of said entities and occurrences and wherein said graphical user interface further comprises a priority navigator function for displaying, monitoring, and allowing said user to manipulate said readable data comparatively according to said predetermined priority data.

18. The invention as set forth in claim 17, wherein said priority navigator function further comprises a scaling function for organizing and categorizing said priority data into a desired range so that said desired range is displayed and monitored for allowing said user to manipulate said readable data.

19. The invention as set forth in claim 2, wherein said graphical user interface further comprises a status function for displaying, monitoring, and allowing said user to manipulate said readable data statistically.

20. The invention as set forth in claim 19, wherein said status function further comprises a sub-window function for continuously displaying desired information of said entities and occurrences of said environment for allowing said user to manipulate said readable data.

21. An electronic awareness system for evaluating, monitoring, and controlling, in real-time, an outside environment having entities and occurrences with characteristics, said electronic awareness system comprising:

input sensors for receiving real-time data produced by said entities and occurrences and for providing input data indicative of said characteristics of said entities and occurrences;

a computer workstation coupled to said input sensors and receptive of said input data and having means for storing said input data in a database;

a computer program operating on said workstation and having an interface for accessing said database containing said input data;

wherein said computer program comprises a graphical user interface module for interfacing a user with said workstation and said computer program, said graphical user interface module comprising, a geo-situational module for monitoring and evaluating said input data in a geo-situational format and for producing geo-situational output data, a worksheet module for monitoring and evaluating said input data tabularly and for producing worksheet output data, a utility module for monitoring and evaluating said input data functionally and for producing utility output data, a priority navigator module with predetermined priority data according to said characteristics of each of said entities and occurrences for monitoring and evaluating said input data comparatively and for producing priority navigator output data, and output reactors coupled between said outside environment and said computer program for receiving said geo-situational, worksheet, utility, and priority navigator output data from said computer program for controlling certain entities and occurrences of said outside environment.

22. The invention as set forth in claim 21, wherein said geo-situational module further comprises at least one nested frame module.

23. The invention as set forth in claim 22, wherein said nested frame module comprises at least one map chart frame module for dynamically representing actual positions and motions of said entities and occurrences of said environment in real-time.

24. The invention as set forth in claim 22, wherein said nested frame module comprises at least one rangeless frame module for dynamically representing actual directions and bearings of said entities and occurrences of said environment in real-time.

25. The invention as set forth in claim 21, wherein said geo-situational module further comprises a plan position indicator module for indicating actual positions and motions of said entities and occurrences of said environment in scaled relationship with respect to one another so that said scaled relationship is displayed and monitored on said computer workstation.

26. The invention as set forth in claim 21, wherein said geo-situational module further comprises a filtering module for filtering certain entities and occurrences of said environment to derive desired characteristics of said entities and occurrences so that only said desired characteristics are displayed and monitored on said computer workstation.

27. The invention as set forth in claim 21, wherein said geo-situational module further comprises a symbol module for symbolizing certain entities and occurrences of said environment so that said certain entities and occurrences are displayed and monitored in symbolic format on said computer workstation.

28. The invention as set forth in claim 21, wherein said worksheet module further comprises a filtering module for filtering certain entities and occurrences of said environment to derive desired characteristics of said entities and occurrences so that only said desired characteristics are displayed and monitored on said computer workstation.

29. The invention as set forth in claim 21, wherein said worksheet module further comprises a toolbox module containing certain desired sub-functions so that only said certain sub-functions are displayed and monitored on said computer workstation.

30. The invention as set forth in claim 21, wherein said utility module further comprises a sub-window module for continuously displaying desired information of said entities and occurrences of said environment on said computer workstation.

31. The invention as set forth in claim 21, wherein said priority navigator module further comprises a scaling module for organizing and categorizing said priority data into a desired range so that said desired range is displayed and monitored on said computer workstation.

32. The invention as set forth in claim 21, wherein said graphical user interface module further comprises a status module for producing status output data, wherein said output reactors receive said status output data from said computer program for statistically controlling certain entities and occurrences of said outside environment.

33. The invention as set forth in claim 32, wherein said status module further comprises a sub-window module for continuously displaying desired information of said entities and occurrences of said environment on said computer workstation.

34. A computer-readable medium for causing a computer to function as an electronic awareness system for evaluating, monitoring, and controlling, in real-time, an outside environment having entities and occurrences with characteristic data, comprising:

a computer-readable storage medium;

a computer program stored on said medium;

said computer program having an interface for accessing in real-time a database containing said characteristic data associated with said entities and occurrences;

said computer program having a graphical user interface module for interfacing a user with said computer program and said characteristic data, said graphical user interface comprising, a geo-situational module for monitoring and evaluating said input data in a geo-situational format and for producing geo-situational output data, a worksheet module for monitoring and evaluating said input data tabularly and for producing worksheet output data, a utility module for monitoring and evaluating said input data functionally and for producing utility output data, and a priority navigator module for monitoring and evaluating said input data comparatively with a predetermined relative priority scale and for producing navigator output data; and an output reactor module coupled between said outside environment and said computer program for receiving said geo-situational, worksheet, utility, and navigator output data from said computer program for controlling certain entities and occurrences of said outside environment.

35. The invention as set forth in claim 34, wherein said geo-situational module further comprises at least one nested frame module.

36. The invention as set forth in claim 35, wherein said nested frame module comprises at least one map chart frame module for dynamically representing actual positions and motions of said entities and occurrences of said environment in real-time.

37. The invention as set forth in claim 35, wherein said nested frame module comprises at least one rangeless frame module for dynamically representing actual directions and bearings of said entities and occurrences of said environment in real-time.

38. The invention as set forth in claim 34, wherein said geo-situational module further comprises a plan position indicator module for indicating actual positions and motions of said entities and occurrences of said environment in scaled relationship with respect to one another so that said scaled relationship is displayed and monitored on said computer workstation.

39. The invention as set forth in claim 34, wherein said geo-situational module further comprises a filtering module for filtering certain entities and occurrences of said environment to derive desired characteristics of said entities and occurrences so that only said desired characteristics are displayed and monitored on said computer workstation.

40. The invention as set forth in claim 34, wherein said geo-situational module further comprises a symbol module for symbolizing certain entities and occurrences of said environment so that said certain entities and occurrences are displayed and monitored in symbolic format on said computer workstation.

41. The invention as set forth in claim 34, wherein said worksheet module further comprises a filtering module for filtering certain entities and occurrences of said environment to derive desired characteristics of said entities and occurrences so that only said desired characteristics are displayed and monitored on said computer workstation.

42. The invention as set forth in claim 34, wherein said worksheet module further comprises a toolbox module containing certain desired sub-functions so that only said certain sub-functions are displayed and monitored on said computer workstation.

43. The invention as set forth in claim 34, wherein said utility module further comprises a sub-window module for continuously displaying desired information of said entities and occurrences of said environment on said computer workstation.

44. The invention as set forth in claim 34, wherein said priority navigator module further comprises a scaling module for organizing and categorizing said priority data into a desired range so that said desired range is displayed and monitored on said computer workstation.

45. The invention as set forth in claim 34, wherein said graphical user interface module further comprises a status module for producing status output data, wherein said output reactors receive said status output data from said computer program for statistically controlling certain entities and occurrences of said outside environment.

46. The invention as set forth in claim 45, wherein said status module further comprises a sub-window module for continuously displaying desired information of said entities and occurrences of said environment on said computer workstation.

47. A computer implemented process for evaluating, monitoring, and controlling, in real-time, an outside environment having entities and occurrences with characteristics, said implemented process comprising the steps of:

(a) receiving real-time input data produced by said entities and occurrences indicative of said characteristics of said entities and occurrences;

(b) storing said input data in a memory;

(c) preparing said data by accessing said input data, processing said data into readable data, monitoring said input data, evaluating said input data, and performing computer manipulation of said input data;

(d) interfacing a reader with said input data in real-time by providing said readable data in a geo-situational format to said reader for reader monitoring, reader evaluation, and reader manipulation of said readable data; and (e) physically manipulating said environment according to said computer manipulation of said input data and said reader manipulation of said readable data.

48. The process of claim 47, further comprising the step of displaying said readable data to a user in user readable format so that said user monitors, evaluates, and provides manipulation of said readable data in real-time for physically manipulating said environment.

49. The process of claim 48, further comprising the step of displaying, monitoring, and allowing said user to manipulate said readable data graphically.

50. The process of claim 48, further comprising the step of dynamically representing actual positions and motions of said entities and occurrences of said environment in real-time for displaying, monitoring, and allowing said user to manipulate said readable data.

51. The process of claim 48, further comprising the step of dynamically representing actual directions and bearings of said entities and occurrences of said environment in real-time for displaying, monitoring, and allowing said user to manipulate said readable data.

52. The process of claim 48, further comprising the step of indicating actual positions and motions of said entities and occurrences of said environment in scaled relationship with respect to one another so that said scaled relationship is displayed and monitored for allowing said user to manipulate said readable data.

53. The process of claim 48, further comprising the step of filtering certain entities and occurrences of said environment to derive desired characteristics of said entities and occurrences so that only said desired characteristics are displayed and monitored for allowing said user to manipulate said readable data.

54. The process of claim 48, further comprising the step of symbolizing certain entities and occurrences of said environment so that said certain entities and occurrences are displayed and monitored in symbolic format for allowing said user to manipulate said readable data.

55. The process of claim 48, further comprising the step of displaying, monitoring, and allowing said user to manipulate said readable data tabularly.

56. The process of claim 55, further comprising the step of filtering certain entities and occurrences of said environment to derive desired characteristics of said entities and occurrences so that only said desired characteristics are displayed and monitored for allowing said user to manipulate said readable data.

57. The process of claim 48, further comprising the steps of displaying, monitoring, and allowing said user to manipulate said readable data functionally.

58. The process of claim 57, further comprising the step of continuously displaying desired information of said entities and occurrences of said environment for allowing said user to manipulate said readable data.

59. The process of claim 48, wherein each of said entity and occurrence has predetermined priority data according to said characteristics of each of said entities and occurrences and further comprising the steps of displaying, monitoring, and allowing said user to manipulate said readable data comparatively according to said predetermined priority data.

60. The process of claim 59, further comprising the step of organizing and categorizing said priority data into a desired range so that said desired range is displayed and monitored for allowing said user to manipulate said readable data.

61. The process of claim 48, further comprising the steps of displaying, monitoring, and allowing said user to manipulate said readable data statistically.

62. The process of claim 61, further comprising the step of continuously displaying desired information of said entities and occurrences of said environment for allowing said user to manipulate said readable data.

* * * * *